United States Patent
White et al.

(10) Patent No.: US 11,327,185 B2
(45) Date of Patent: May 10, 2022

(54) NEUTRON IMAGING SYSTEM HAVING NEUTRON SHIELD

(71) Applicant: Nova Scientific, Inc., Sturbridge, MA (US)

(72) Inventors: Brian White, Palmer, MA (US); W. Bruce Feller, Tolland, CT (US); R. Gregory Downing, Niskayuna, NY (US)

(73) Assignee: Photonis Scientific, Inc., Sturbridge, MA (US)

( * ) Notice: Subject to any disclaimer, the term of this patent is extended or adjusted under 35 U.S.C. 154(b) by 134 days.

(21) Appl. No.: 16/795,077

(22) Filed: Feb. 19, 2020

(65) Prior Publication Data

US 2020/0309973 A1    Oct. 1, 2020

Related U.S. Application Data

(60) Provisional application No. 62/808,112, filed on Feb. 20, 2019.

(51) Int. Cl.
*G01T 3/08* (2006.01)
*G01T 1/28* (2006.01)
(Continued)

(52) U.S. Cl.
CPC ............... *G01T 3/085* (2013.01); *G01T 1/28* (2013.01); *G01T 3/00* (2013.01); *H01J 31/50* (2013.01)

(58) Field of Classification Search
CPC .... G01T 1/28; G01T 3/06; G01T 3/08; G01T 3/085; H01J 31/50
See application file for complete search history.

(56) References Cited

U.S. PATENT DOCUMENTS

| 6,870,894 B2 | 3/2005 | Leung et al. |
| 7,183,701 B2 | 2/2007 | Downing et al. |

(Continued)

FOREIGN PATENT DOCUMENTS

| EP | 3410104 | | 12/2018 |
| JP | 10062365 A | * | 3/1998 |
| JP | H1062365 | | 3/1998 |

OTHER PUBLICATIONS

International Search Report and Written Opinion in International Appln. No. PCT/US2020/018833, dated Jul. 15, 2020, 17 pages.

(Continued)

*Primary Examiner* — Mark R Gaworecki
(74) *Attorney, Agent, or Firm* — Fish & Richardson P.C.

(57) ABSTRACT

A neutron imaging system includes a neutron generator, a flight tube, a stage, a neutron imaging module, and a neutron shield. The flight tube enables neutrons from the neutron generator to enter the flight tube through an input opening and exit through an output opening. The stage supports a sample object to receive neutrons that pass through the entire length of the flight tube and the output opening. The neutron imaging module has a neutron-sensitive component that receives neutrons that pass through the sample object and generates neutron detection signals. The neutron shield surrounds at least a portion of the flight tube and the neutron imaging module to block at least a portion of stray neutrons that travel toward the neutron-sensitive component of the neutron imaging module, in which the stray neutrons do not enter the flight tube through the input opening of the flight tube.

45 Claims, 14 Drawing Sheets

(51) Int. Cl.
    *G01T 3/00*         (2006.01)
    *H01J 31/50*     (2006.01)

(56) References Cited

U.S. PATENT DOCUMENTS

| | | |
|---|---|---|
| 7,439,519 B2 | 10/2008 | Feller et al. |
| 8,076,634 B2 | 12/2011 | Stoller |
| 8,173,967 B2 | 5/2012 | Feller et al. |
| 8,207,506 B2 | 6/2012 | Zhong et al. |
| 8,445,858 B2 | 5/2013 | Feller et al. |
| 8,445,861 B2 | 5/2013 | Feller et al. |
| 8,507,872 B2 | 8/2013 | Feller et al. |
| 8,884,237 B2 | 11/2014 | Downing et al. |
| 9,040,934 B2 | 5/2015 | Baroni et al. |
| 9,297,914 B2 | 3/2016 | Chappell et al. |
| 9,941,438 B2 | 4/2018 | Feller et al. |

OTHER PUBLICATIONS

International Preliminary Report on Patentability in International Appln. No. PCT./US2020/018833, dated Aug. 10, 2021, 15 pages.
jlab.org [online], "New Shielding is Designed to Put the Block on Neutrons," Jefferson Lab, Dec. 9, 2013, retrieved on Oct. 11, 2021, retrieved from URL <https://www.jlab.org/news/stories/new-shielding-designed-put-block-neutrons>, 9 pages.

\* cited by examiner

NEUTRON IMAGING SYSTEM HAVING NEUTRON SHIELD

CROSS-REFERENCE TO RELATED APPLICATIONS

This application claims priority to U.S. Provisional Application 62/808,112, filed on Feb. 20, 2019, the entire contents of which is herein incorporated by reference.

BACKGROUND

This invention relates to neutron imaging systems having neutron shields.

Neutron-sensitive microchannel plates (MCP) can be used as effective detectors in neutron imaging applications. A microchannel plate can be formed by bonding a glass plate between an input electrode and an output electrode, and providing a high voltage direct current (DC) field between the electrodes. The glass plate is perforated with a substantially regular, parallel array of microscopic channels, for example, cylindrical and hollow channels. Each channel, which can serve as an independent electron multiplier, has an inner wall surface formed of a semi-conductive and electron emissive layer.

The glass plate can be doped with, for example, boron-10, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. Alternatively, although having a smaller neutron capture cross-section, the glass plate can be doped with lithium-6, resulting in triton and alpha particle reaction products which likewise produce a cascade of electrons. The electron cascades develop along the channels and are amplified into detectable signals that are electronically registered and processed to construct a digital image. The resultant intensity map or image corresponds to the variation in neutron flux striking the microchannel plate surface.

SUMMARY

This disclosure describes a novel microchannel plate-based neutron imaging system that has a high resolution and contrast. Neutrons from a neutron generator pass through a sample object to be imaged and are detected by a microchannel plate neutron detector. The neutrons pass through a flight tube and optionally one or more microchannel plate collimators. A neutron shield wraps around the flight tube to provide a shielded flight tube to prevent neutrons scattered by objects in the environment from entering the flight tube and reaching the neutron detector. Similarly, a neutron shield wraps around the microchannel plate detector to provide a shielded microchannel plate detector to prevent neutrons scattered by objects in the environment from reaching the neutron detector. As a result, most or all of the neutrons that reach the detector are from a collimated neutron beam that passes through the sample object to be imaged without previously being scattered by objects in the environment. This neutron imaging system has a better resolution and contrast compared to a neutron imaging system that does not provide neutron shielding around the flight tube and the microchannel plate detector.

In a general aspect, a neutron imaging system for generating a neutron image of an object is provided. The neutron imaging system includes a neutron generator, a shielded flight tube, a sample chamber, and a shielded neutron detector. The neutron generator is configured to provide neutrons. The shielded flight tube has an input opening, an output opening, a flight tube wall extending from the input opening to the output opening, and a flight tube shield surrounding the flight tube wall. The flight tube is positioned relative to the neutron generator to enable neutrons from the neutron generator to enter the flight tube through the input opening and exit the flight tube through the output opening, and the flight tube shield is configured to substantially block neutrons outside of the flight tube from entering the flight tube through the flight tube wall. The sample chamber is configured to support a sample object at a position to receive neutrons that pass through the output opening of the flight tube. The shielded neutron detector includes a microchannel plate detector and a detector shield. The microchannel plate detector includes an input electrode, an output electrode, and a microchannel plate defining microscopic channels. The input electrode is configured to be connected to a first voltage, and the output electrode is configured to be connected to a second voltage different from the first voltage. The neutron detector is configured to receive at least a portion of the neutrons that pass through the sample object and generate output signals upon detection of the neutrons. The detector shield is configured to substantially block neutrons other than those that have traveled inside the entire length of flight tube and pass through the output opening of the flight tube from reaching the neutron detector.

In another general aspect, a neutron imaging system is provided. The neutron imaging system includes a neutron generator, an elongated flight tube, a sample chamber, a neutron detector, and a neutron shield that substantially surrounds the flight tube and the neutron detector. The neutron generator is configured to generate a neutron beam. The elongated flight tube has an input opening, an output opening, and a flight tube wall extending from the input opening to the output opening. The flight tube is positioned relative to the neutron generator to enable neutrons from the neutron generator to enter the flight tube through the input opening and exit the flight tube through the output opening, and the flight tube has a length to diameter (L/D) ratio of at least 10. The sample chamber is configured to support a sample at a position to receive neutrons that pass through the output opening of the flight tube. The neutron detector includes a microchannel plate detector having an input electrode, an output electrode, and a glass plate including microscopic channels. The input electrode is configured to be connected to a first voltage, the output electrode is configured to be connected to a second voltage different from the first voltage, and the neutron detector is configured receive at least a portion of the neutrons that pass through the sample and generate output signals upon detection of the neutrons. The neutron imaging system includes circuitry configured to process the output signals of the neutron detector to generate an image or a video of the sample. The neutron shield substantially surrounds the flight tube and the neutron detector, in which the neutron shield has an opening around the input opening of the flight tube to allow neutrons to enter the flight tube through the input opening. The neutron shield includes a material that is configured to substantially block neutrons outside of the flight tube from entering the flight tube through the flight tube wall, the neutron shield is configured to allow neutrons exiting the output opening of the flight tube to reach the neutron detector and substantially block neutrons other than those that have traveled inside the entire length of flight tube and exit the output opening of the flight tube from reaching the neutron detector.

In another general aspect, a neutron imaging system includes a neutron generator, a flight tube, a stage, a neutron imaging module, and a neutron shield. The neutron generator is configured to provide neutrons. The flight tube has an input opening, an output opening, and a flight tube wall extending from the input opening to the output opening. The flight tube is positioned relative to the neutron generator to enable neutrons from the neutron generator to enter the flight tube through the input opening and exit the flight tube through the output opening. The stage is configured to support a sample object at a position to receive neutrons that pass through the entire length of flight tube and exit through the output opening of the flight tube. The neutron imaging module has a neutron-sensitive component that is sensitive to neutrons and configured to receive neutrons that pass through the sample object and generate neutron detection signals that can be used to generate an image or video of the sample object. The neutron shield surrounds at least a portion of the flight tube and at least a portion of the neutron imaging module to block at least a portion of stray neutrons that travel toward the neutron-sensitive component of the neutron imaging module, in which the stray neutrons do not enter the flight tube through the input opening of the flight tube.

Implementations of the neutron imaging system can include one or more of the following features. The neutron shield can include at least one of borated-polyethylene, lithiated-polyethylene, boron carbide (B4C), borated carbide aluminum (Boral®, $B_4CAl$), Boraflex (silicone polymer and boron carbide powder), borated silicone sheet (Flexi-Boron), gadolinium, cadmium, boron-loaded bricks, or lithium-loaded bricks. The neutron shield can surround the flight tube, the stage, and the neutron imaging module, and can have an input opening that aligns with an output opening of the neutron generator, and the input opening of the neutron shield can allow neutrons emitted from the output opening of the neutron generator to reach the flight tube. In some examples, the neutron-sensitive component can include a microchannel plate that has a material that is sensitive to neutrons. In some examples, the neutron imaging module can include an anode that receives charge pulses output from microchannels of the microchannel plate, and a delay line readout that is capacitively coupled to the anode. The neutron imaging system can include a constant fraction discriminator (CFD) and an amplifier to process signals provided by the delay line readout. In some examples, the neutron imaging module can include a phosphor or phosphorous screen that receives charge pulses output from microchannels of the microchannel plate and generates light signals based on the charge pulses. The imaging module can include a camera configured to detect the light signals generated by the phosphor screen. In some examples, the microchannel plate can be disposed in an evacuated hermetically sealed image tube. In some examples, the microchannel plate can be disposed in an actively pumped vacuum enclosure. In some examples, the neutron-sensitive component can include a neutron-sensitive scintillator. In some examples, the neutron imaging module can include a component to convert light from the scintillator to electron charge signals, and a microchannel plate to amplify the electron charge signals. The component for converting the light from the scintillator to electron charge signals can include a photo-cathode. In some examples, the neutron imaging module can include a camera configured to detect the light signals generated by the scintillator. The neutron generator can include a compact linear accelerator, and the neutron generator is configured to produce neutrons by fusing isotopes of hydrogen.

Unless otherwise defined, all technical and scientific terms used herein have the same meaning as commonly understood by one of ordinary skill in the art to which this invention belongs. In case of conflict with patent applications or patents incorporated herein by reference, the present specification, including definitions, will control.

DETAILED DESCRIPTION

This disclosure describes a novel microchannel plate based neutron imaging system that has a high resolution and contrast. Neutrons from a neutron generator pass through a sample object to be imaged and are detected by a microchannel plate neutron detector. The neutrons pass through a flight tube and optionally one or more microchannel plate collimators. A neutron shield wraps around the flight tube to provide a shielded flight tube to prevent neutrons scattered by objects in the environment from entering the flight tube and reaching the neutron detector. Similarly, a neutron shield wraps around the microchannel plate detector to provide a shielded microchannel plate detector to prevent neutrons scattered by objects in the environment from reaching the neutron detector. As a result, most or all of the neutrons that reach the detector are from a collimated neutron beam that passes through the sample object to be imaged without previously being scattered by objects in the environment. This neutron imaging system has a better resolution and contrast compared to a neutron imaging system that does not provide neutron shielding around the flight tube and the microchannel plate detector.

Previous neutron imaging systems provided neutron shielding to protect people from harmful neutrons, but the neutron shielding was not provided around the flight tube and the microchannel plate detector. Because neutrons cannot be seen by the human eye, it may be difficult to know that the neutrons scattered by objects in the environment affect the microchannel plate detector and that it would useful to provide a neutron shield around the flight tube or the microchannel plate detector or preferably both.

Figure 1:
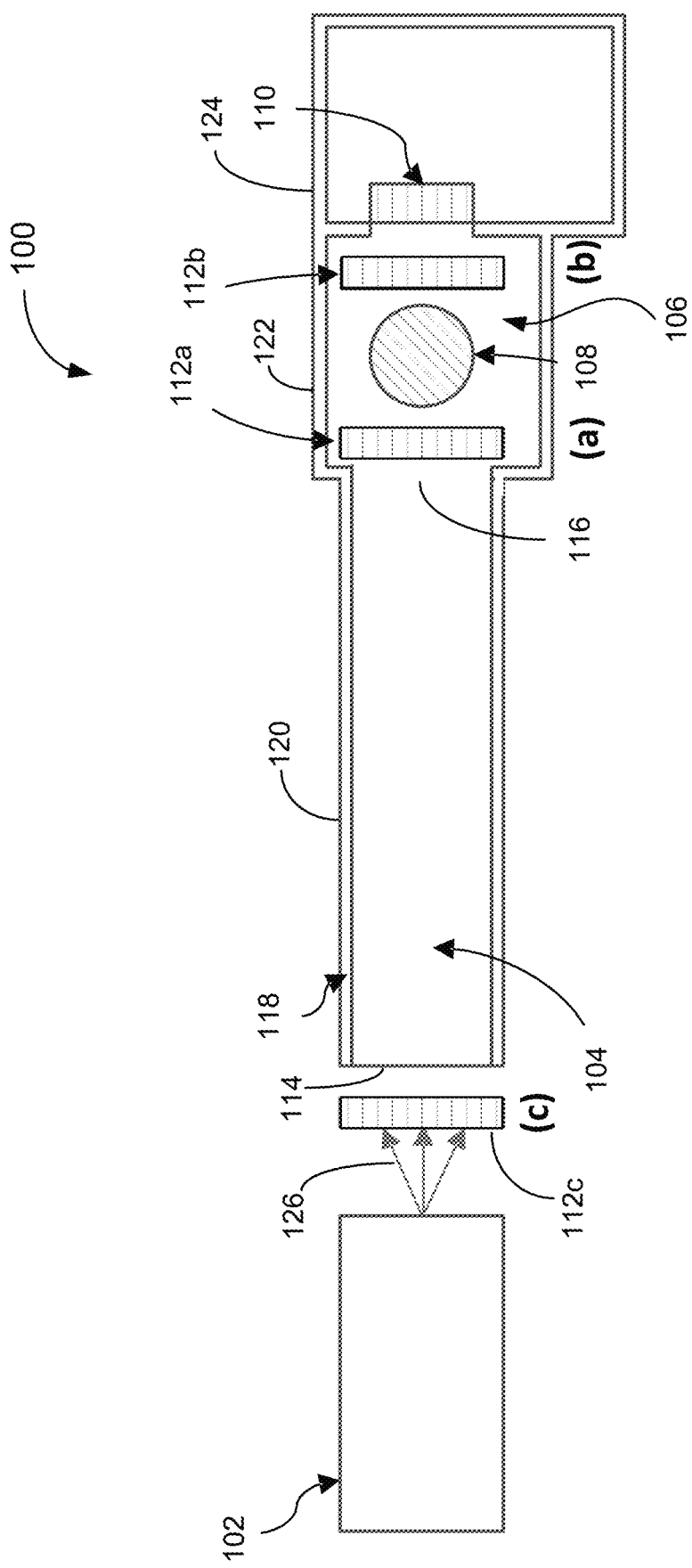
FIG. 1 is a block diagram of an example neutron imaging system.

Referring to FIG. 1, in some implementations, a neutron imaging system 100 includes a neutron generator 102, a flight tube 104, a chamber 106, and a microchannel plate detector 110. A sample object 108 to be imaged is placed inside the chamber 106. The neutron generator 102 generates neutrons 126 that pass through the flight tube 104 to produce a collimated neutron beam that passes the sample objects 108 and is detected by the microchannel plate detector 110. The system 100 includes additional components for reading out the signals generated by the microchannel plate detector 110. These components are shown in, e.g., FIGS. 4 to 7.

The flight tube 104 allows the sample object 108 to be placed far enough away from the neutron generator so that the neutrons that reach the sample object will have flight paths that are substantially parallel to one another. Using a neutron beam in which the neutrons have substantially parallel paths enables the neutron image to have a better quality, as compared to using neutrons that paths that are not substantially parallel. The flight tube 104 provides a mechanism to select the neutrons that travel the long distance from the neutron generator 102 to the sample object 108 without being scattered.

A feature of the neutron imaging system 100 is that, in some implementations, the flight tube 104, the chamber 106, and the microchannel plate detector 110 are shielded using a neutron blocking or neutron absorbing material 118 so that stray neutrons (e.g., neutrons scattered by objects in the environment) have small or no effect on the neutron images generated by the system 100. This allows the system 100 to produce neutron images of the sample object 108 with a higher quality (e.g., better resolution and contrast) than previous neutron imaging systems that do not shield the flight tube, the chamber, and the microchannel plate detector. The structure that includes neutron blocking or neutron absorbing material 118 and provides shielding to the flight tube 104 is referred to as the flight tube shield 120, and the structure that includes neutron blocking or neutron absorbing material 118 and provides shielding to the chamber 106 is referred to as the chamber shield 122.

The shielded flight tube 104 reduces or eliminates neutron scatter (otherwise known as "sky-shine"), and the prompt gamma rays produced from the neutron scatter, from the surrounding environment and thus reduces the background blurring in the neutron images derived from the neutron detection signals generated by the microchannel plate detector 110. When the flight tube 104 is sealed and evacuated to remove a substantial amount of air from the inside of the flight tube 104, the evacuated flight tube 104 reduces or eliminates neutron scatter, and the prompt gamma rays produced from the neutron scatter, from the air inside the flight tube 104 and thus further reduces or eliminates the background blurring in the neutron images derived from the neutron detection signals generated by the microchannel plate detector 110.

The structure that includes neutron blocking or neutron absorbing material 118 and provides shielding to the microchannel plate detector 110 is referred to as the detector shield 124. In this example, the neutron shield wraps around the side and rear of the microchannel plate detector 110 and substantially blocks stray neutrons that travel toward the microchannel plate detector 110 from the sides and/or the rear.

In some implementations, each of the flight tube 104, the chamber 106, and the microchannel plate detector 110 has its own neutron shield. When the flight tube 104 is coupled to the chamber 106, the neutron shield for the flight tube 104 is coupled to the neutron shield for the chamber 106. When the chamber 106 is coupled to the microchannel plate detector 110, the neutron shield for the chamber 106 is coupled to the shielded housing 124. For example, the output opening 116 of the flight tube 104 is aligned with the input opening of the chamber 106, and the output opening of the chamber 106 is aligned with the input opening of the microchannel plate detector 110.

By shielding the flight tube 104, the chamber 106, and the microchannel plate detector 110 from stray neutrons, it is possible to use a neutron generator that emits neutrons in various directions without causing the neutron images to be degraded by the stray neutrons. In some implementations, the neutron imaging system 100 is configured as a portable, self-contained system that can be conveniently moved from one location to another. The neutron imaging system 100 can be used for, e.g., neutron radiography and neutron tomography.

Neutron computed tomography is a nondestructive three-dimensional imaging method in which a neutron beam passes through the sample object 108, and the neutrons are coherently or incoherently scattered, or absorbed, by atomic nuclei in the sample object 108. The remaining neutron flux is imaged using a neutron imaging module placed behind the sample. The neutron imaging module can include a neutron-sensitive microchannel plate or a neutron-sensitive scintillation screen. The sample object 108 is placed on top of a stage that is rotated by a fraction of a degree between each exposure. The resulting set of radiographs is then reconstructed using the inverse of the Radon transform to generate a 3D image of the local attenuation in the sample object 108.

To further collimate the neutron beam, one or more microchannel plate collimators may be provided. In some examples, a microchannel plate collimator 112a is placed between the flight tube 104 and the sample object 108. For example, the microchannel plate collimator 112a can be placed in the chamber 106 and upstream of (or in front of) the sample 108. In some examples, a microchannel plate collimator 112b is placed between the sample object 108 and the microchannel plate detector 110. For example, the microchannel plate collimator 112b can be placed in the chamber 106 and downstream of (or behind) the sample 108.

In some examples, a microchannel plate collimator 112c is placed between the neutron generator 102 and the sample object 108, either upstream or inside the flight tube 104. Here, the terms "upstream" and "downstream" are based on the direction of travel of the neutrons output from the neutron generator 102. The collimators 112a, 112b, and 112c are collectively referred to as collimator 112. The system 100 can have a single microchannel plate collimator (e.g., 112a, 112b, or 112c), two microchannel plate collimators (e.g., any two of 112a, 112b, and 112c), or three microchannel plate collimators (e.g., 112a, 112b, and 112c). It is also possible to use more than three microchannel plate collimators.

For example, a first microchannel plate neutron collimator 112a can be placed upstream of the sample 108 at the location (a), and a second microchannel plate neutron collimator 112b can be placed downstream of the sample object 108 at the location (b). For example, a first microchannel plate neutron collimator 112c can be placed upstream of the flight tube 104 at the location (c), and a second microchannel plate neutron collimator 112a can be placed upstream of the sample object 108 at the location (a). For example, a first microchannel plate neutron collimator 112a can be placed upstream of the flight tube 104 at the location (c), and a second microchannel plate neutron collimator 112b can be placed downstream of the sample object 108 at the location (b). For example, a first microchannel plate neutron collimator 112c can be placed upstream of the flight tube 104 at the location (c), a second microchannel plate neutron collimator 112a can be placed upstream of the sample object 108 at the location (a), and a third microchannel plate neutron collimator 112b can be placed downstream of the sample object 108 at the location (b).

In some examples, the microchannel plate neutron collimator 112 can include two or more stacked microchannel plates. For example, when two or more microchannel plate neutron collimators 112 are used, one microchannel plate neutron collimator 112 can include at least one of boron, Gd, or lithium, and another microchannel plate neutron collimator 112 can include hydrogenous material. The hydrogenous material can capture fast neutrons from an unmoderated neutron generator source.

The microchannel plate neutron collimator 112 operates passively and is not an electronically active detector. The microchannel plate neutron collimator 112 includes a microchannel plate that has many microchannels that align or "boresight" incoming neutrons to obtain a crisp neutron image at the microchannel plate detector 110, as well as to reject off-axis neutrons. The microchannel plate neutron collimator 112 is doped with neutron sensitive material to capture the neutrons that enter the walls of the microchannel plate neutron collimator 112. Only the neutrons that pass the microchannels without hitting the walls will exit the microchannel plate neutron collimator 112. For example, thermal neutrons can be collimated using a boron/Gd/Li-doped microchannel plate, and fast neutrons can be collimated using a microchannel plate containing hydrogenous material. For example, a microchannel plate neutron collimator 112 can be doped with (i) at least one of boron/Gd/Li, and (ii) hydrogenous material so that the collimator 112 can collimate both thermal neutrons and fast neutrons.

The microchannels of the microchannel plate neutron collimator 112 can have a length-to-diameter ratio (L1/d1) of at least 10, or at least 50, or at least 100, or at least 500, or at least 1000, or at least 2000. The parameter L1 represents the length of the microchannels, and the parameter d1 represents the diameter of the microchannels. In some examples, the microchannel length-to-diameter ratio L1/d1 is comparable to the overall length-to-diameter L2/D ratio of the neutron imaging system 100. The L2/D ratio of a neutron beam used for imaging is the main parameter to describe image blurring by the neutron beam, with the associated geometric "unsharpness" given by $$Ug = d2/[(L2-d2)/D]d2/(L2/D).$$

Here, d2 is the distance from the sample object 108 to the microchannel plate detector 110, L2 is the distance between neutron generator 102 and the microchannel plate detector 110, and D is the source "diameter" or the actual aperture at the point where neutrons then enter the separate aperture or opening of the input opening 114 of the flight tube 104. For example, the neutron imaging system 100 can have an L2/D ratio of about 100 to 250. For example, the neutron imaging system 100 can be designed to have a higher image resolution in which the L2/D ratio can be in a range from about 500 to 1000.

In some implementations, the neutron shield for the flight tube 104, the neutron shield for the chamber 106, and the neutron shield for the microchannel plate detector 110 are connected to form a partially enclosed structure, as shown in FIG. 1, such that the flight tube 104, the chamber 106, and the microchannel plate detector 110 are substantially enclosed by the neutron shield except for an input opening 114 of the flight tube. The neutrons from the neutron generator 102 enter the flight tube 104 through the input opening 114. Among the neutrons that enter the flight tube 104, only the neutrons whose flight paths are substantially parallel (quasiparallel) to the longitudinal axis of the flight tube 104 pass through the entire length of the flight tube 104 and reach an exit opening 116 of the flight tube 104, forming a collimated or substantially collimated neutron beam. The neutron beam may be further collimated by the one or more microchannel plate collimators (e.g., 112a, 112b, 112c). The neutron beam passes the sample object 108 and the neutrons are detected by the microchannel plate detector 110 to form a good quality neutron image of the sample object 108. For example, the chamber 106 has a door that can be opened to allow the sample object 108 to be placed into the chamber 106 or removed from the chamber 106. The door is covered by the neutron blocking or neutron absorbing material that can block stray neutrons when the door is closed. For example, the sample object 108 is placed on a stage (not shown in the figure) inside the chamber 106, and the stage can be moved by actuators along the x, y, and z directions. This allows the system 100 to take images of different parts of the object 108. For example, the stage can be rotated to allow the system 100 to take images of the object 108 from different angles.

In some implementations, the neutron blocking or neutron absorbing material 118 includes at least one of borated-polyethylene, lithiated-polyethylene, boron carbide (B4C), borated carbide aluminum (Boral®, $B_4CAl$), Boraflex (silicone polymer and boron carbide powder), borated silicone sheet (Flexi-Boron, available from Shieldwerx, LLC, New Mexico), gadolinium, or cadmium. The neutron shields can be made of, e.g., at least one of boron-loaded bricks or lithium-loaded bricks. In some implementations, flight tube shield 120, the chamber shield 122, and the detector shield 124 also include a material that block gamma rays, in which the material has a high atomic number and a high density, such as lead (Pb), iron (Fe), tungsten (W), bismuth (Bi), or tantalum (Ta). The flight tube neutron shield greatly attenuates "off-axis" neutrons to prevent stray neutrons from returning from the room surroundings at random and entering the microchannel plate detector 110, introducing image blur at the microchannel plate detector 110.

In some implementations, when the neutron shield includes gadolinium, the gadolinium absorbs neutrons in reactions that produce many gamma rays. A layer of high atomic number, high density material is provided around the neutron detector (including between the sample object 108 and the microchannel plate detector 110) to reduce the amount of gamma rays and other products resulting from reactions between neutrons and the gadolinium that reach the neutron detector. Boron-10 also produces a single gamma ray for each neutron absorbed by a boron-10 atom. For example, the high density material can include lead (Pb), iron (Fe), tungsten (W), bismuth (Bi), or tantalum (Ta).

In some implementations, the neutron shield includes a first concrete layer to slow down neutrons, a second concrete layer to absorb the neutrons, and a layer of lead or iron to stop any residual radiation produced in this process. For example, the first concrete layer includes plastic that has hydrogen atoms. The neutrons are thermalized when they strike the hydrogen atoms. In some implementations, the first concrete layer does not use grit and rocks but instead uses a lightweight shale product to provide strength to the first concrete layer. For example, the first concrete layer can include Portland cement, water, and lightweight shale. The second concrete layer is loaded with boron to absorb the neutrons. For example, the second concrete layer includes boron carbide, Portland cement, and water. For example, lead or iron plates are applied to stop any other radiation that may result from the neutron-boron collisions. For example, the lead layer can be covered with an aluminum panel to prevent human contact with the lead. In some implementations, the neutron shield can be made of boron embedded in an epoxy resin that is poured into a mold to produce a neutron shield having the desired shape, similar to the process for making molded countertops, except that the materials in the countertops are replaced with boron-rich materials.

For example, some previous neutron imaging systems use neutron beams generated by specialized facilities, such as the Spallation Neutron Source at the Oak Ridge National Laboratory. The Spallation Neutron Source provides intense pulsed neutron beams using an accelerator-based system that delivers short (microsecond) proton pulses to a steel target filled with liquid mercury to produce neutrons through a spallation process. The neutrons can be directed toward neutron imaging instruments in which the neutrons pass through sample objects and are detected by neutron detectors. The neutron beam provided by the Spallation Neutron Source is highly directional and can be used to generate good quality images. However, the neutron imaging systems that use the neutron beams from the Spallation Neutron Source have to be set up in the vicinity of the Spallation Neutron Source.

For example, some neutron generators, such as those available from Adelphi Technology, Inc., Redwood City, Calif., are neutron source devices that contain compact linear accelerators and that produce neutrons by fusing isotopes of hydrogen together. The fusion reactions take place in the devices by accelerating either deuterium, tritium, or a mixture of these two isotopes into a metal hydride target which also contains either deuterium, tritium or a mixture. Fusion of deuterium atoms (D+D) results in the formation of a He-3 ion and a neutron with a kinetic energy of approximately 2.5 MeV. Fusion of a deuterium and a tritium atom (D+T) results in the formation of a He-4 ion and a neutron with a kinetic energy of approximately 14.1 MeV. In some examples, the D+T reaction has a yield that is 50 to 100 times higher than that of the D+D reaction. In some examples, neutrons produced from the fusion reaction are emitted in various directions.

Previously, neutron imaging systems that use neutron generators based on fusion reactions that emit neutrons in various directions produce images that are blurry, have a low resolution, have a low contrast, and/or have considerable image noise. The inventors discovered that the reason for the low quality of the images is likely at least partly due to scattering and/or reflection of neutrons, which then enter or strike the microchannel plate detector 110 from random directions and angles, including from the backside. The neutrons will not pass through the sample object 108 to be imaged. If the stray neutrons strike the microchannel plate detector 110 and generate pulses, this will degrade or blur image formation. For example, the neutrons can be scattered and/or reflected by objects in the environment, such as by walls, ceiling, or floor of the rooms where the neutron imaging systems are located. The neutrons may also be scattered off of nearby equipment and constituent molecules in the air (e.g., nitrogen). The stray neutrons impinge on the sensor device at various angles, reducing the resolution of the images. Previous neutron imaging systems have been used in facilities where neutron shields are provided to protect human operators from exposure to excess amounts of neutron radiation.

For example, a material (e.g., water, plastic, or concrete) having hydrogen atoms can be used to slow down neutrons, and a material having a high neutron capture cross section (e.g., boron, lithium, gadolinium, or cadmium) can be used to absorb the slowed neutrons. When the neutron is absorbed, it may cause high energy gamma rays to be emitted, and a gamma shield (e.g., lead or bismuth) may be used to block the gamma rays.

The inventors discovered that the quality of the images produced by a neutron imaging system that uses a neutron generator (e.g., a neutron generator based on fusion reactions) that emits neutrons in various directions can be improved by providing shielding to components of the neutron imaging system to block the stray neutrons scattered or reflected by objects in the environment so that only neutrons that travel substantially parallel to (or travel along paths within a small angle relative to) a main axis of the neutron imaging system are detected by the sensor device.

In some implementations, shielding from gamma rays is also provided. In some implementations, techniques for distinguishing a neutron detection event from a gamma detection event are used. For example, see the techniques described in U.S. Pat. No. 7,439,519 (attorney docket 06547-0012001), issued on Oct. 21, 2008, U.S. Pat. No. 8,445,861 (attorney docket 06547-0022001), issued on May 21, 2013, and U.S. Pat. No. 9,297,914 (attorney docket 06547-0025001), issued on Mar. 29, 2016. The entire contents of the above patents are herein incorporated by reference. U.S. Pat. No. 7,439,519 is provided in Appendix A, U.S. Pat. No. 8,445,861 is provided in Appendix E, and U.S. Pat. No. 9,297,914 is provided in Appendix C.

The following describes example configurations of the neutron imaging system 100. It is understood that the system 100 can have other configurations not limited to the examples described in this document. In some implementations, the neutron generator 102 includes a compact linear accelerator, and the neutron generator is configured to produce neutrons by fusing isotopes of hydrogen. For example, the neutron generator 102 is configured to produce neutrons from fusion reaction. For example, the neutron generator 102 is configured to accelerate and direct ionized hydrogen isotopes toward a target that also includes hydrogen isotopes, causing a fusion reaction that results in neutrons being emitted. For example, the neutron generator 102 can be, e.g., a DD110 2.45 MeV neutron generator or a DT110 14.1 MeV neutron generator, both available from Adelphi Technology. For example, the neutron generator 102 does not include a nuclear fission reactor neutron source, does not include a radioisotope fission neutron source, and does not include a radionuclide fission neutron source.

In some implementations, the shielded flight tube 104 is opened ended, in which the input opening 114 and the output opening 116 are open to the ambient environment and the flight tube 104 is filled with air or gases from the ambient environment. In some implementations, the input opening 114 and the output opening 116 are made of a material or materials transparent to neutrons. For example, the flight tube 104 can be sealed and connected to a vacuum pump that evacuates the flight tube 104 to reduce the pressure inside the flight tube 104 to be less than the standard atmospheric pressure. In some implementations, the flight tube 104 is filled (or partially filled) with inert gas, such as helium or argon. The flight tube 104 can have a length-to-diameter ratio in a range from about 10 to 1000 or more. For example, the flight tube 104 can have a length-to-diameter ratio of at least 10, or at least 50, or at least 100, or at least 500, or at least 1000. For example, each of the microscopic channels of the microchannel plate neutron collimator 112 can have a length-to-diameter ratio in a range from about 10 to 2000 or more. For example, each of the microscopic channels of the microchannel plate neutron collimator 112 can have a length-to-diameter ratio of at least 10, or at least 50, or at least 100, or at least 500, or at least 1000, or at least 2000.

The shielded chamber 106 is positioned after the shielded flight tube 104 in the path of the neutrons. The shielded chamber 106 includes a stage that supports the sample object 108. The microchannel plate detector 110 receives neutrons that pass through the shielded chamber 106. In some implementations, the microchannel plate detector 110 includes (e.g., is doped with) boron-10, gadolinium, or lithium-6, and is sensitive to thermal neutrons (e.g., neutrons having an energy of about 0.025 eV). In some implementations, the microchannel plate detector 110 includes a microchannel plate that includes hydrogenous material (material that includes hydrogen), and is sensitive to fast neutrons (e.g., neutrons having an energy in a range of about 100 keV to about 20 MeV). The hydrogenous material can capture fast neutrons from an unmoderated neutron generator source, so the microchannel plate having hydrogenous material can be used with a fast neutron generator for imaging. In some implementations, the microchannel plate detector 110 includes a stack of three microchannel plates, in which the front microchannel plate is B/Gd-doped, the middle microchannel plate contains hydrogenous material, and the rear microchannel plate is a standard microchannel plate glass without neutron-sensitive material. In some implementations, the microchannel plate detector 110 includes a stack of three microchannel plates, in which the front microchannel plate contains hydrogenous material, the middle microchannel plate is B/Gd-doped, and the rear microchannel plate is a standard microchannel plate glass without neutron-sensitive material. For example, the microchannel plate detector 110 can have a stack of four or more microchannel plates.

For example, the hydrogen-containing material includes high-density polyethylene, Nylon™, or polyaramid. When the hydrogen-containing material is incorporated in a microchannel plate, neutron radiation can strike and release energetic protons within the microchannel plate and produce secondary electrons. When the site of the reaction or interaction is sufficiently close to the surface of a microchannel, which can have a layer of electron-emissive material, the reaction products escape through the electron emissive surface layer and cause an emission of secondary electrons inside the hollow microchannels. A cascade of electrons can be produced in the microchannels. Additional information about the use of hydrogenous material in the interaction with neutrons can be found in, e.g., U.S. Pat. No. 7,183,701, issued on Feb. 27, 2007, and provided in Appendix J. The entire contents of U.S. Pat. No. 7,183,701 are herein incorporated by reference. U.S. Pat. No. 7,183,701 describes the use of hydrogenous material in a plate having reticulated structure, but the same principles can be applied to using hydrogenous material in a microchannel plate.

The microchannel plate detector 110 can be fast-gated (the detector 110 is gateable), in which the microchannel plate bias voltage is rapidly gated (to about 10 nanoseconds). This can be useful when the neutron generator 102 generates a pulsed neutron beam to reduce background noise.

The following describes several examples of the configurations of the microchannel plate detector 110 and the microchannel plate collimator 112. In some examples, the microchannel plate detector 110 includes a neutron-sensitive microchannel plate that includes hafnium (Hf), samarium (Sm), erbium (Er), neodymium (Nd), tantalum (Ta), lutetium (Lu), europium (Eu), dysprosium (Dy), or thulium (Tm), or any combination of the above. In some examples, the neutron-sensitive microchannel plate includes boron-10, lithium-6, or gadolinium, or any combination of the above. In some examples, the neutron-sensitive microchannel plate includes a hydrogen-containing material. In some examples, the hydrogen-containing material includes a polymer or a plastic or both.

In some examples, the neutron-sensitive microchannel plate includes (i) at least one of boron-10, lithium-6 or gadolinium, and (ii) at least one of hafnium (Hf), samarium (Sm), erbium (Er), neodymium (Nd), tantalum (Ta), lutetium (Lu), europium (Eu), dysprosium (Dy), or thulium (Tm). In some examples, the neutron-sensitive microchannel plate includes (i) at least one of boron-10, lithium-6 or gadolinium, and (ii) a hydrogen-containing material. In some examples, the neutron-sensitive microchannel plate includes (i) at least one of boron-10, lithium-6 or gadolinium, (ii) at least one of hafnium (Hf), samarium (Sm), erbium (Er), neodymium (Nd), tantalum (Ta), lutetium (Lu), europium (Eu), dysprosium (Dy), or thulium (Tm), and (iii) a hydrogen-containing material. In some examples, the neutron-sensitive microchannel plate includes (i) at least one of hafnium (Hf), samarium (Sm), erbium (Er), neodymium (Nd), tantalum (Ta), lutetium (Lu), europium (Eu), dysprosium (Dy), or thulium (Tm), and (ii) a hydrogen-containing material.

In some examples, the microchannel plate detector 110 includes two stacked microchannel plates that include a first microchannel plate and a second microchannel plate, in which the first microchannel plate includes at least one of boron-10, lithium-6, or gadolinium, and the second microchannel plate includes a non-neutron-sensitive amplifier microchannel plate. In some examples, the microchannel plate detector includes at least two stacked microchannel plates that include a first microchannel plate and a second microchannel plate, in which the first microchannel plate includes at least one of boron-10, lithium-6, or gadolinium, and the second microchannel plate includes a hydrogen-containing material. In some examples, the microchannel plate detector includes at least two stacked microchannel plates that include a first microchannel plate and a second microchannel plate, in which the first microchannel plate includes a hydrogen-containing material, and the second microchannel plate includes at least one of boron-10, lithium-6, or gadolinium. In some examples, the microchannel plate detector 110 includes two stacked microchannel plates that include a first microchannel plate and a second microchannel plate, in which the first microchannel plate includes at least one of boron-10, lithium-6 or gadolinium, and the second microchannel plate includes at least one of hafnium (Hf), samarium (Sm), erbium (Er), neodymium (Nd), tantalum (Ta), lutetium (Lu), europium (Eu), dysprosium (Dy), or thulium (Tm). In some examples, the microchannel plate detector 110 includes two stacked microchannel plates that include a first microchannel plate and a second microchannel plate, in which the first microchannel plate includes at least one of hafnium (Hf), samarium (Sm), erbium (Er), neodymium (Nd), tantalum (Ta), lutetium (Lu), europium (Eu), dysprosium (Dy), or thulium (Tm), and the second microchannel plate includes a hydrogen-containing material.

In some examples, the microchannel plate detector 110 includes two stacked microchannel plates that include a first microchannel plate and a second microchannel plate, in which the first microchannel plate includes (i) at least one of boron-10, lithium-6 or gadolinium, and (ii) a hydrogen-containing material, and the second microchannel plate includes a non-neutron-sensitive amplifier microchannel plate. In some examples, the microchannel plate detector 110 includes two stacked microchannel plates that include a first microchannel plate and a second microchannel plate, in which the first microchannel plate includes (i) at least one of boron-10, lithium-6 or gadolinium, (ii) a hydrogen-containing material, and (iii) at least one of hafnium (Hf), samarium (Sm), erbium (Er), neodymium (Nd), tantalum (Ta), lutetium (Lu), europium (Eu), dysprosium (Dy), or thulium (Tm), and the second microchannel plate includes a non-neutron-sensitive amplifier microchannel plate. In some examples, the microchannel plate detector 110 includes two stacked microchannel plates that include a first microchannel plate and a second microchannel plate, in which the first microchannel plate includes (i) at least one of hafnium (Hf), samarium (Sm), erbium (Er), neodymium (Nd), tantalum (Ta), lutetium (Lu), europium (Eu), dysprosium (Dy), or thulium (Tm), and (ii) a hydrogen-containing material, and the second microchannel plate includes a non-neutron-sensitive amplifier microchannel plate.

In some examples, the microchannel plate detector 110 includes at least three stacked microchannel plates that include a first microchannel plate, a second microchannel plate, and a third microchannel plate, in which the first microchannel plate includes at least one of boron-10, lithium-6, or gadolinium, the second microchannel plate includes a hydrogen-containing material, and the third microchannel plate includes a non-neutron-sensitive amplifier microchannel plate. In some examples, the microchannel plate detector 110 includes at least three stacked microchannel plates that include a first microchannel plate, a second microchannel plate, and a third microchannel plate, in which the first microchannel plate includes at least one of boron-10, lithium-6 or gadolinium, the second microchannel plate includes at least one of hafnium (Hf), samarium (Sm), erbium (Er), neodymium (Nd), tantalum (Ta), lutetium (Lu), europium (Eu), dysprosium (Dy), or thulium (Tm), and the third microchannel plate includes a non-neutron-sensitive amplifier microchannel plate. In some examples, the microchannel plate detector 110 includes at least three stacked microchannel plates that include a first microchannel plate, a second microchannel plate, and a third microchannel plate, in which the first microchannel plate includes at least one of boron-10, lithium-6 or gadolinium, the second microchannel plate includes at least one of hafnium (Hf), samarium (Sm), erbium (Er), neodymium (Nd), tantalum (Ta), lutetium (Lu), europium (Eu), dysprosium (Dy), or thulium (Tm), and the third microchannel plate includes a hydrogen-containing material.

In some examples, the microchannel plate detector 110 includes four stacked microchannel plates that include a first microchannel plate, a second microchannel plate, a third microchannel plate, and a fourth microchannel plate, in which the first microchannel plate includes at least one of boron-10, lithium-6 or gadolinium, the second microchannel plate includes at least one of hafnium (Hf), samarium (Sm), erbium (Er), neodymium (Nd), tantalum (Ta), lutetium (Lu), europium (Eu), dysprosium (Dy), or thulium (Tm), the third microchannel plate includes a hydrogen-containing material, and the fourth microchannel plate includes a non-neutron-sensitive amplifier microchannel plate.

In some examples, the microchannel plate neutron collimator 112 includes a microchannel plate defining a plurality of microscopic channels, in which each of the microscopic channels has a length to diameter (L/D) ratio of at least 10, or at least 50, or at least 100, or at least 500, or at least 1000, or at least 2000. The microchannel plate neutron collimator is positioned in the path of at least some of the neutrons provided by the neutron generator 102.

In some examples, the microchannel plate neutron collimator 112 includes at least one of boron-10, lithium-6, or gadolinium. In some examples, the microchannel plate neutron collimator 112 includes a hydrogen-containing material that collimates fast neutrons from an unmoderated neutron generator source. In some examples, the microchannel plate collimator 112 includes a plurality of microchannels, each microchannel includes a cladding glass and a hollow core, and the cladding glass includes at least one of boron-10, lithium-6, or gadolinium. In some examples, the microchannel plate collimator 112 includes a plurality of microchannels, each microchannel includes a cladding glass and a core, the cladding glass includes at least one of boron-10, lithium-6, or gadolinium, and the core does not include a neutron sensitive material.

In some examples, the microchannel plate collimator 112 includes a plurality of microchannels, each microchannel includes a cladding glass and a core, the cladding glass includes at least one of hafnium (Hf), samarium (Sm), erbium (Er), neodymium (Nd), tantalum (Ta), lutetium (Lu), europium (Eu), dysprosium (Dy), or thulium (Tm), for epithermal neutron collimation. In some examples, the microchannel plate collimator 112 includes a plurality of microchannels, each microchannel includes a cladding glass and a core, the cladding glass includes a hydrogen-containing material that includes at least one of polymer or plastic for fast neutron collimation. In some examples, the microchannel plate collimator 112 includes a plurality of microchannels, each microchannel includes a cladding glass and a core that does not include neutron-absorbing materials or has neutron-absorbing material that is less than 0.01 percent-weight.

Additional examples of configurations of microchannel plates, microchannel plate collimators, and microchannel plate detectors are described in, e.g., U.S. Pat. No. 9,941,438, titled "Neutron Detection" (attorney docket 06547-0028001), provided in Appendix B, U.S. Pat. No. 9,297,914, titled "Neutron Detection" (attorney docket 06547-0025001), provided in Appendix C, U.S. Pat. No. 8,207,506, titled "Neutron Detection" (attorney docket 06547-0024001), provided in Appendix D, U.S. Pat. No. 8,445,861, titled "Neutron Detection Based on Induced Charges" (attorney docket06547-0022001), provided in Appendix E, U.S. Pat. No. 8,507,872, titled "Neutron Detection" (attorney docket 06547-0020001), provided in Appendix F, U.S. Pat. No. 8,445,858, titled "Neutron Detection and Collimation" (attorney docket 06547-0019001), provided in Appendix G, U.S. Pat. No. 8,173,967, titled "Radiation Detectors and Related Methods" (attorney docket 06547-0018001), provided in Appendix H, and U.S. Pat. No. 8,884,237, titled "Neutron Detection" (attorney docket 06547-0016US1), provided in Appendix I. The entire contents of the above patents are incorporated by reference.

In some implementations, the neutron imaging system 100 has a high spatial resolution (e.g., being able to resolve spatial details as small as 15 microns) and a high timing resolution (e.g., being able to resolve neutron timing details as short as 100 nanoseconds, which is determined by the ~1 mm thickness of the microchannel plate, the neutron velocity, and the uncertainty of the interaction point of the neutron within the microchannel plate thickness).

Figure 2:
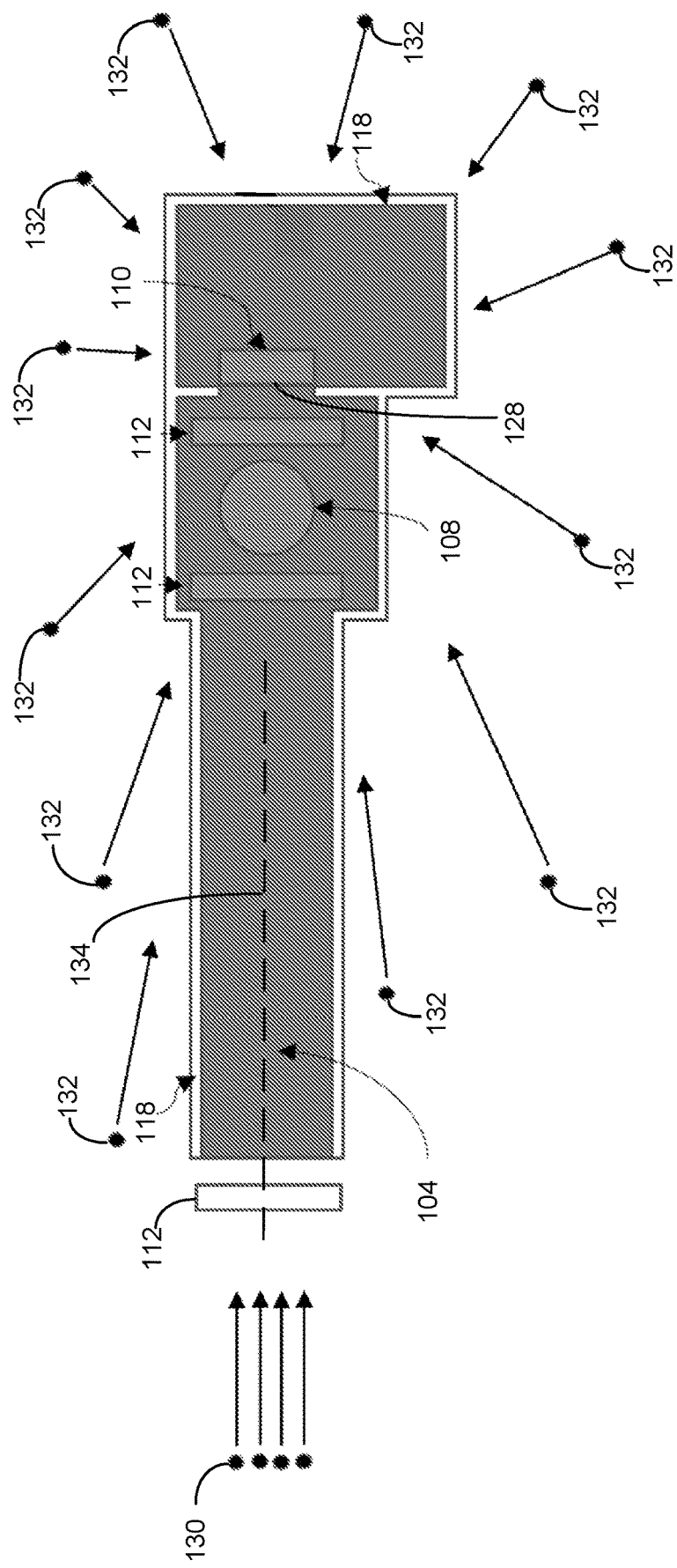
FIG. 2 is a diagram of an example neutron imaging system and neutrons traveling toward the system.

For example, referring to FIG. 2, neutrons 130 that have flight paths substantially parallel to the longitudinal axis 134 of the flight tube 104 travel through the flight tube 104 and the sample object 108, and are detected by the microchannel plate detector 110 to form a neutron image of the sample object 108. Neutrons 132 that have flight paths directed toward the detector 110 but are blocked by the neutron blocking or neutron absorbing material 118 do not reach the detector 110 and do not affect the neutron image. The neutrons 132 can be, e.g., neutrons that are scattered by the objects in the environment, such as the walls of the room where the system 100 is located.

If the neutron blocking or neutron absorbing material 118 were not used, the neutrons 132 that have flight paths that are directed toward the detector 110 but are not substantially parallel to the longitudinal axis of the flight tube 104 may be detected by the detector 110 and cause the neutron image to have a lower resolution and a lower contrast.

In some implementations, the microchannel plate detector 110 is placed in a shielded housing 126 that encloses the detector 110 except for an input 128 that allows neutrons to enter the input of the detector 110.

Figure 3:
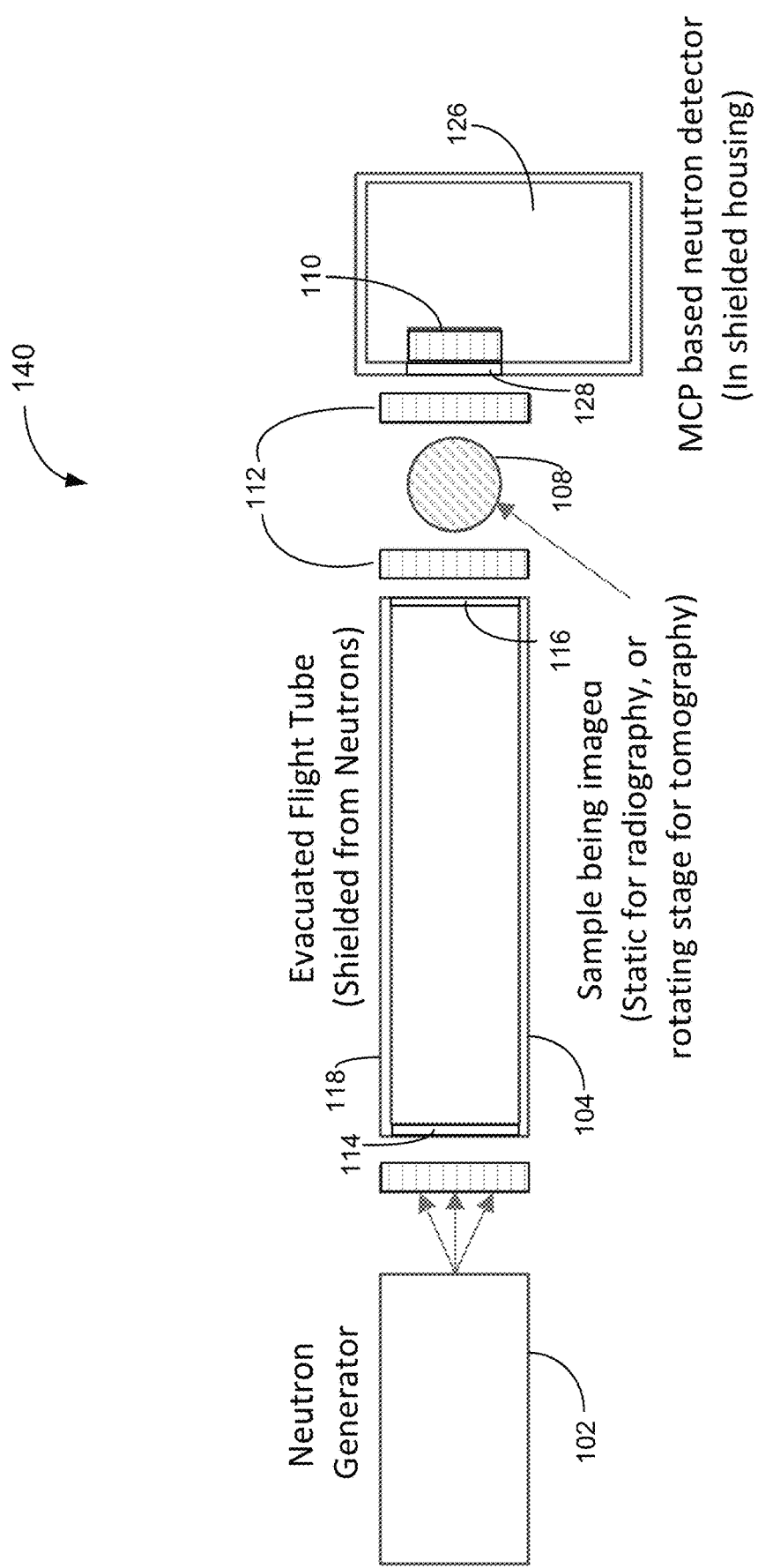
FIG. 3 is a block diagram of another example neutron imaging system.

Referring to FIG. 3, in some implementations, a neutron imaging system 140 is similar to the neutron imaging system 100 of FIG. 1, in which the flight tube 104 and the microchannel plate detector 110 are shielded using the neutron blocking or neutron absorbing material 118, but the sample object 108 is not shielded. For example, the object 108 may be too large to fit inside a readily available shielded chamber. For example, the object 108 may be manipulated using a robotic arm that does not fit inside a readily available shielded chamber. For example, the object 108 is placed on a stage, and the mechanism for translating the stage along the x, y, and/or z directions, and/or for rotating the stage does not fit inside a readily available shielded chamber. For example, the user may prefer to manually reposition the object 108 in order to take neutron images of different parts of the object 108 and/or take neutron images of the object 108 from different angles, and it is more convenient to do so when the object 108 is not placed in an enclosed chamber.

For example, the input opening 114 and the output opening 116 of the flight tube 104 can be open to the atmosphere in the environment, or be sealed using a neutron transparent material. For example, the input 128 of the shielded housing 126 can be open to the atmosphere in the environment, or be sealed using a neutron transparent material.

The neutron images of the object 108 generated by the system 140 may have slightly less resolution and/or contrast compared to the images generated by the system 100. Because the flight tube 104 and the microchannel plate detector 110 of the system 140 are still shielded from stray neutrons, the amount of stray neutrons that reach the detector 110 is still significantly reduced as compared to a system that uses a flight tube and a detector without shielding.

Figure 4:
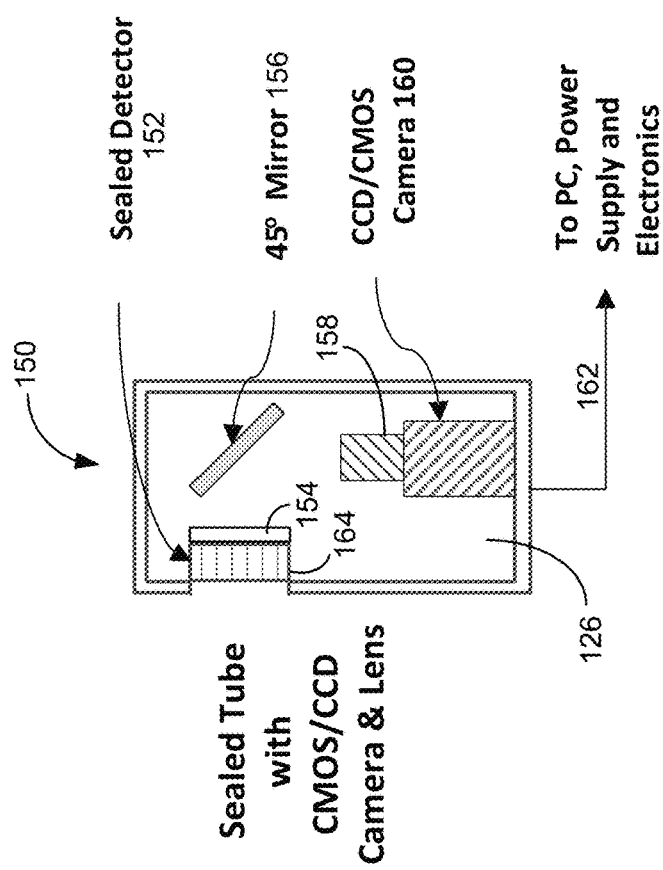

Referring to FIG. 4, in some implementations, a neutron imaging module 150 receives neutrons that pass through the sample object 108 and generates images or videos of the sample object 108. The neutron imaging module 150 includes a sealed detector 152 positioned in a shielded housing 126. The shielded housing 126 includes neutron blocking or neutron absorbing material to block stray neutrons. The sealed detector 152 includes an evacuated hermetically sealed image tube that houses a microchannel plate detector 164 and a phosphor screen 154 positioned at the back of the sealed detector 152. The microchannel plate detector 164 includes a microchannel plate stack having one or more microchannel plates stacked together. The microchannel plates can be sensitive to neutrons having energy in various ranges, such as thermal neutrons (about 0.025 eV), epithermal neutrons (about 0.025 to 0.4 eV), and fast neutrons (about 100 keV to about 20 MeV). The microchannel plate stack can include one or more microchannel plates that are insensitive to neutrons, e.g., just an amplifier. The microchannel plate stack can include any combination of the above microchannel plates.

The microchannel plate detector 164 has a top electrode connected to a more negative voltage and a bottom electrode connected to a more positive voltage, in which the microchannel plate stack is positioned between the electrodes. Upon detection of a neutron, the microchannel plate stack produces a pulse of electrons that hit the phosphor-coated back window on the inside of the evacuated hermetically sealed image tube, which causes the phosphor screen 154 to emit light. A mirror 156 redirects the light emitted from the phosphor screen 154 towards a lens 158 that focuses an image on a camera 160, which can be, e.g., a charge coupled device (CCD) camera or a complementary metal-oxide semiconductor (CMOS).

A signal/power bus 162 electrically couples the electronic components of the neutron imaging module 150 to a power supply, electronic circuitry, and a computer. For example, the electronic circuitry can process signals from the microchannel plate detector 164 to distinguish neutron events from gamma ray events, e.g., using techniques described in U.S. Pat. No. 7,439,519, U.S. Pat. No. 8,445,861, and/or U.S. Pat. No. 9,297,914. For example, the computer includes one or more data processors for processing data from the neutron imaging module 150 to generate images and/or videos of the sample object 108. For example, the computer can compute three-dimensional images of the sample object 108 by combining multiple planar images with a known separation. For example, the neutron tomography can be useful for examining specimens having low contrast between a matrix and objects of interest, e.g., fossils with a high carbon content, such as plants or vertebrate remains.

For example, the mirror 156 can be oriented about 45 degrees relative to the main axis 134 of the flight tube 104, and the optical axes of the lens 158 and the camera 160 are oriented about 90 degrees relative to the main axis 134 of the flight tube 104. However, the mirror 156 can be oriented at other angles. The neutrons 130 from the neutron generator 102 can have high energy and may cause damage to electronic circuitry. An advantage of the neutron imaging module 150 is that the mirror 156 allows the lens 158 and the camera 160 to be moved outside of the path of the neutrons 130, thereby preventing damage to the electronic circuitry of the camera 160 by the neutrons 130.

Figure 5:
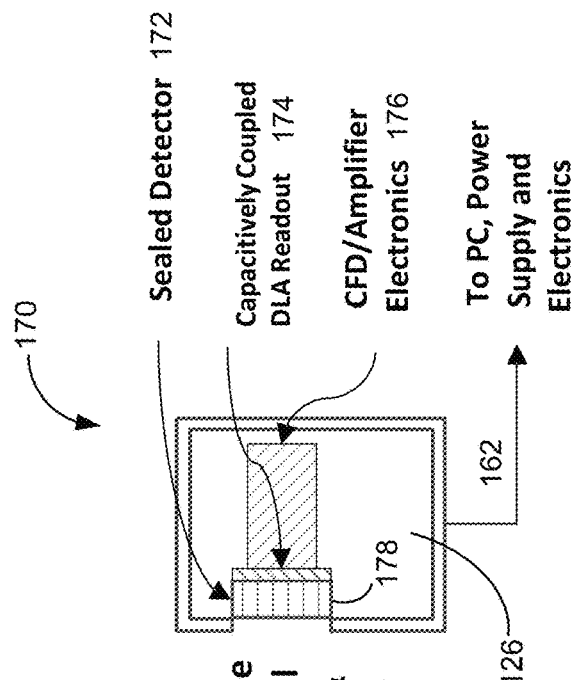
FIGS. 4 and 5 are diagrams of example configurations of shielded neutron imaging modules.

Referring to FIG. 5, in some implementations, a neutron imaging module 170 receives neutrons that pass through the sample object 108 and generates images or videos of the sample object 108. The neutron imaging module 170 includes a sealed detector 172 positioned in a shielded housing 126 that includes neutron blocking or neutron absorbing material to block stray neutrons. In some examples, the sealed detector 172 includes an evacuated hermetically sealed image tube that houses a microchannel plate detector 178. The microchannel plate detector 178 includes an input electrode, an output electrode, a microchannel plate stack between the input and output electrodes, and an anode (e.g., a Germanium resistive film anode). The microchannel plate stack includes one or more microchannel plates stacked together. The neutron imaging module 170 further includes a delay line two-dimensional (2D) readout 174, and a constant fraction discriminator (CFD) and amplifier electronics module 176.

A signal/power bus 162 electrically couples the electronic components of the neutron imaging module 170 to a power supply, electronic circuitry, and a computer. For example, the electronic circuitry can process signals from the microchannel plate detector 178 to distinguish neutron events from gamma ray events, e.g., using the technique described in U.S. Pat. No. 7,439,519, U.S. Pat. No. 8,445,861, and/or U.S. Pat. No. 9,297,914. For example, the electronic circuitry processes signals from the constant fraction discriminator and amplifier electronics module 176. For example, the computer includes one or more data processors for processing data from the neutron imaging module 170 to generate images and/or videos of the sample object 108.

Figure 6:
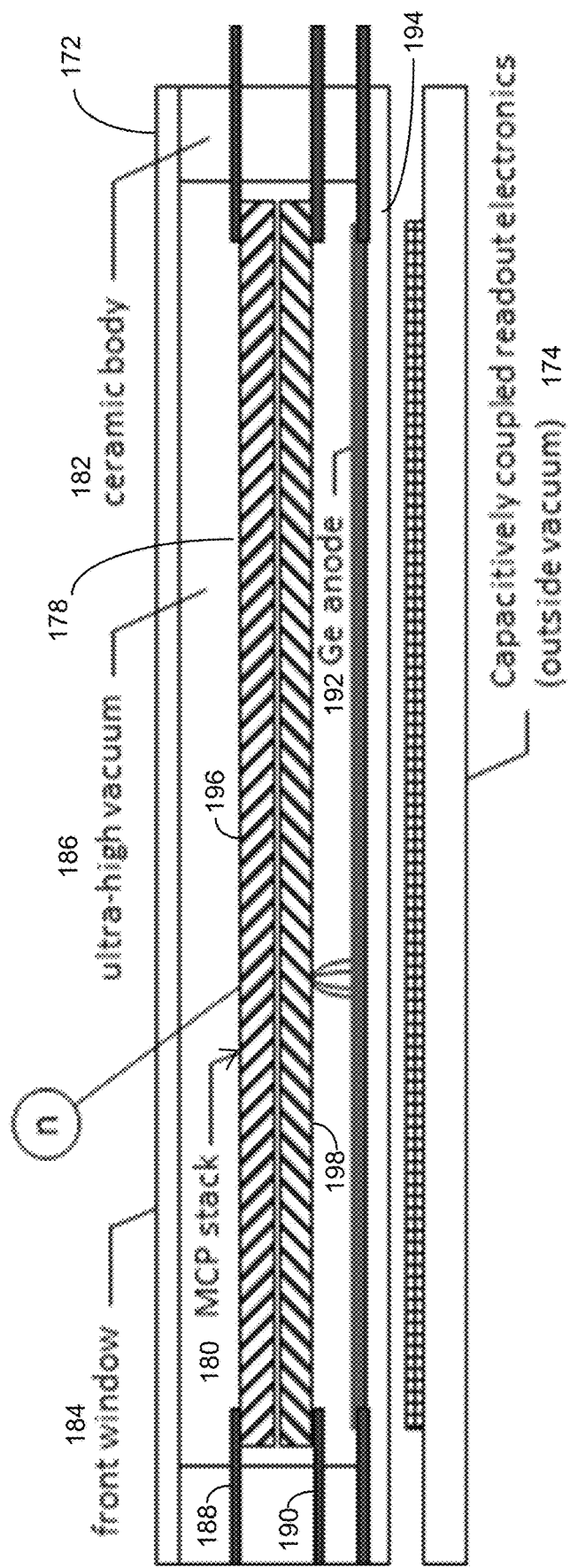
FIG. 6 is a diagram of an example sealed microchannel plate detector and readout electronic circuitry.

Referring to FIG. 6, in some implementations, the sealed detector 172 includes the microchannel plate detector 178 positioned in an evacuated hermetically sealed image tube formed of a ceramic body 182 and a front window 184. The inside of the evacuated hermetically sealed image tube is pumped to have a low pressure. In some examples, the inside of the evacuated hermetically sealed image tube has an ultra-high vacuum 186. The microchannel plate detector 178 includes the microchannel plate stack 180, an input electrode 188, an output electrode 190, and an anode 192 (e.g., Germanium resistive film anode). The input electrode 188 is positioned at the side of the microchannel plate stack 180 where neutrons are input to the microchannel plate stack 180. The microchannel plate stack 180 includes one or more microchannel plates. In the example of FIG. 6, the microchannel plate stack 180 includes a first microchannel plate 196 and a second microchannel plate 198. The microchannel plates can be sensitive to neutrons having energy in various ranges, such as thermal neutrons (about 0.025 eV), epithermal neutrons (about 0.025 to 0.4 eV), and fast neutrons (about 100 keV to about 20 MeV). The microchannel plate stack 180 can include one or more microchannel plates that are insensitive to neutrons, e.g., just an amplifier. The microchannel plate stack can include any combination of the above microchannel plates.

The microchannel plate detector 178 can include a center electrode, which is optional and not shown in the figure. The input electrode 188 and the output electrode 190 generate a voltage difference between the input face and the output face of the microchannel plate stack 180. The neutron-sensitive microchannel plate stack 180 outputs charge pulses that fall onto the anode 192, which is then capacitively coupled to an externally mounted delay line two-dimensional (2D) readout 174 through a back ceramic wall 194 of the sealed detector 172.

In some examples, the delay line readout 174 includes a two-dimensional wire grid. When a charge pulse from the microchannel plate stack hits the wire grid at a specific position on a delay line anode, the pulse splits in two and travels in two directions along the delay line. The time difference between the time of arrival of each pulse at both ends of the anode is linearly proportional to the original position on the anode, so it is possible to determine where that pulse took place (in 2D space) by examining the arrival timing of each pulse.

Figure 7:
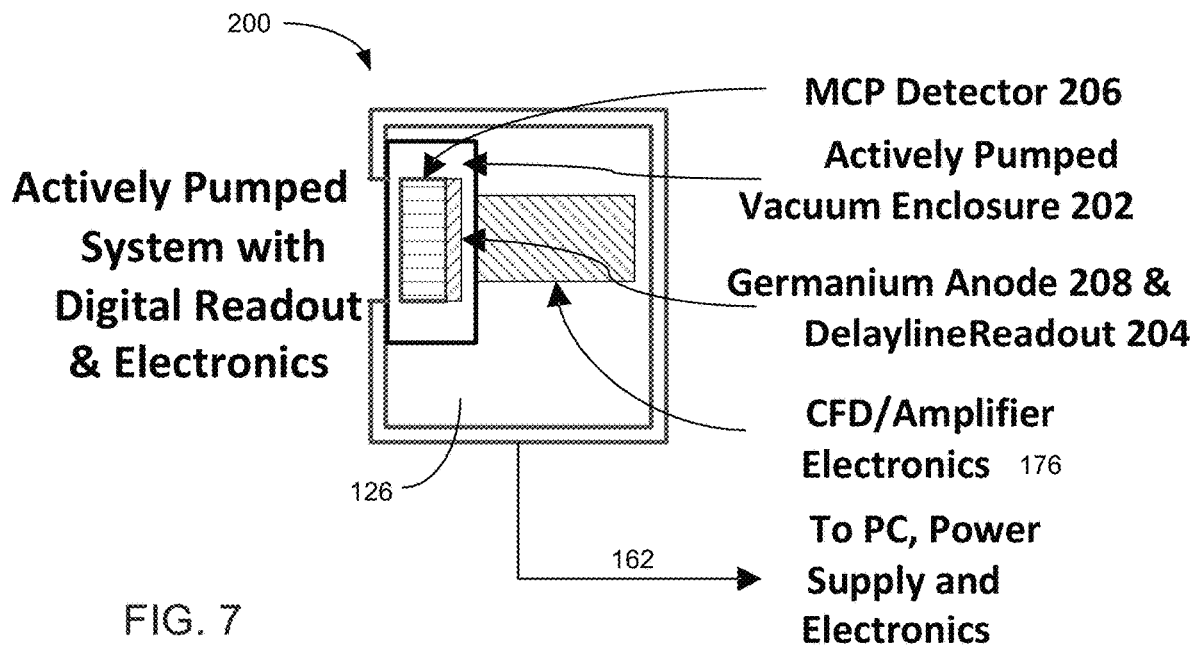
FIGS. 7 to 10 are diagrams of example configurations of shielded neutron imaging modules.

Referring to FIG. 7, in some implementations, a neutron imaging module 200 receives neutrons that pass through the sample object 108 and generates images or videos of the sample object 108. The neutron imaging module 200 includes a microchannel plate detector 206, a Germanium film anode 208, and a delay line readout 204 placed in an actively pumped vacuum enclosure 202, which in turn is placed in a shielded housing 126. The shielded housing 126 includes neutron blocking or neutron absorbing material to block stray neutrons. The outputs of the delay line readout 204 are provided to a constant fraction discriminator and amplifier electronics module 176.

A signal/power bus 162 electrically couples the electronic components of the neutron imaging module 200 to a power supply, electronic circuitry, and a computer. For example, the electronic circuitry processes signals from the microchannel plate detector 206 to distinguish neutron events from gamma ray events, e.g., using the coincidence technique described in U.S. Pat. No. 7,439,519, U.S. Pat. No. 8,445,861, and/or U.S. Pat. No. 9,297,914. For example, the electronic circuitry processes signals from the constant fraction discriminator and amplifier electronics module 176. For example, the computer includes one or more data processors for processing data from the neutron imaging module 200 to generate images and/or videos of the sample object 108. The neutron imaging module 200 operates in a manner similar to the neutron imaging module 170 of FIG. 5, except that the microchannel plate detector 206, the Germanium film anode 208, and the delay line readout 204 are placed in the actively pumped vacuum enclosure 202.

Figure 8:
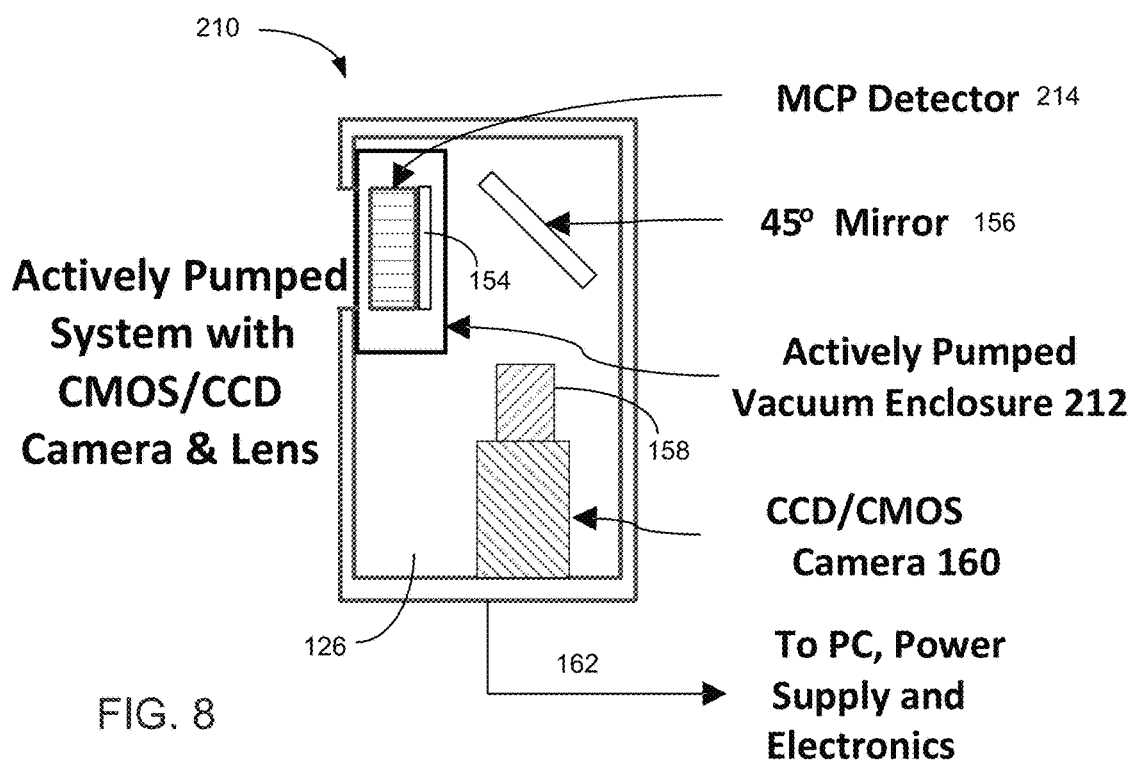

Referring to FIG. 8, in some implementations, a neutron imaging module 210 receives neutrons that pass through the sample object 108 and generates images or videos of the sample object 108. The neutron imaging module 210 includes a microchannel plate detector 214 and a phosphor screen 154 placed in an actively pumped vacuum enclosure 212, which in turn is placed in a shielded housing 126. The shielded housing 126 includes neutron blocking or neutron absorbing material to block stray neutrons.

The microchannel plate detector 214 includes an input electrode, an output electrode, and a microchannel plate stack between the electrodes. Upon detection of a neutron, the microchannel plate stack produces a pulse of electrons that hit the phosphor screen 154, which causes the phosphor screen 154 to emit light. A mirror 156 redirects the light emitted from the phosphor screen or the crystal scintillation detector plate 154 towards a lens 158 that focuses an image on a camera 160, which can be, e.g., a charge coupled device (CCD) camera or a complementary metal-oxide semiconductor (CMOS).

A signal/power bus 162 electrically couples the electronic components of the neutron imaging module 210 to a power supply, electronic circuitry, and a computer. For example, the electronic circuitry can process signals from the microchannel plate detector 214 to distinguish neutron events from gamma ray events, e.g., using the coincidence technique described in U.S. Pat. No. 7,439,519, and/or the induced pulse technique described in U.S. Pat. No. 8,445,861 and. U.S. Pat. No. 9,297,914. For example, the computer includes one or more data processors for processing data from the neutron imaging module 210 to generate images and/or videos of the sample object 108. The neutron imaging module 210 operates in a manner similar to the neutron imaging module 150 of FIG. 4, except that the microchannel plate detector 214 and the phosphor screen 154 are placed in the actively pumped vacuum enclosure 212 instead of an evacuated hermetically sealed image tube.

Figure 9:
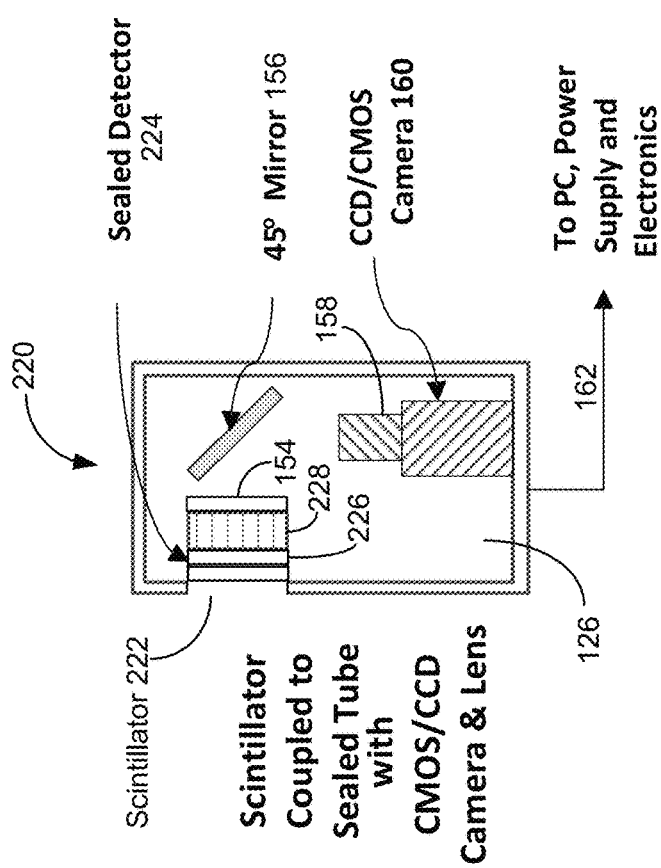

Referring to FIG. 9, in some implementations, a neutron imaging module 220 receives neutrons that pass through the sample object 108 and generates images or videos of the sample object 108. The neutron imaging module 220 includes a scintillator (or scintillation screen) 222 and a sealed detector 224 positioned in a shielded housing 126.

For example, the scintillator 222 includes neutron-sensitive material such as $^6$Li and a scintillation material such as zinc sulfide (ZnS). The shielded housing 126 includes neutron blocking or neutron absorbing material to block stray neutrons. The scintillator 222 is sensitive to neutrons and generates light upon detection of neutrons. The scintillator 222 generates an optical image of the sample object 108, and the light generated by the scintillator 222 is amplified by the sealed detector 224.

For example, the neutron sensitive scintillator 222 includes ZnS and LiF. Slow neutrons (e.g., having energies <0.4 eV) are detected by nuclear reactions. The detection reaction $^6$Li+n→$^3$H+$^4$He is exothermic with an energy of 4.7 MeV. This energy is distributed as kinetic energy among the reaction products, the $^4$He and $^3$H particles. The reaction products are stopped within the zinc sulfide (ZnS) scintillation material. Because gadolinium is sensitive to neutrons, thinned X-ray scintillation screens made of gadolinium oxysulfide ($Gd_2O_2S$) can be used for neutron detection.

For example, the sealed detector 222 includes a photo-cathode 226, a microchannel plate detector 228, and a phosphor screen 154. The photo-cathode 226 converts the light from the scintillator 222 to electrons, the microchannel plate detector 228 multiplies the electrons from the photo-cathode 226, and the phosphor screen 154 converts the electric signals from the microchannel plate detector 228 to light signals. The microchannel plate detector 228 can be either sensitive to neutrons or not sensitive to neutrons. When a neutron-sensitive microchannel plate is used, the microchannel plate can detect neutrons having particular energies that are difficult to detect by the scintillator 222. Thus, the neutron-sensitive scintillator 222 and the neutron-sensitive microchannel plate detector 228 in combination are configured to detect neutrons having a wider range of energies, as compared to using either the scintillator 222 or the microchannel plate detector 228 alone. When a microchannel plate that is not sensitive to neutrons is used, the microchannel plate is used to amplify the electron signals produced by the photo-cathode 226.

A mirror 156 redirects the light emitted from the phosphor screen 154 towards a lens 158 that focuses an image on a camera 160, which can be, e.g., a charge coupled device (CCD) camera or a complementary metal-oxide semiconductor (CMOS). A signal bus 162 electrically couples the electronic components of the neutron imaging module 220 to a power supply, electronic circuitry, and a computer. For example, the computer includes one or more data processors for processing data from the neutron imaging module 220 to generate images and/or videos of the sample object 108.

Figure 10:
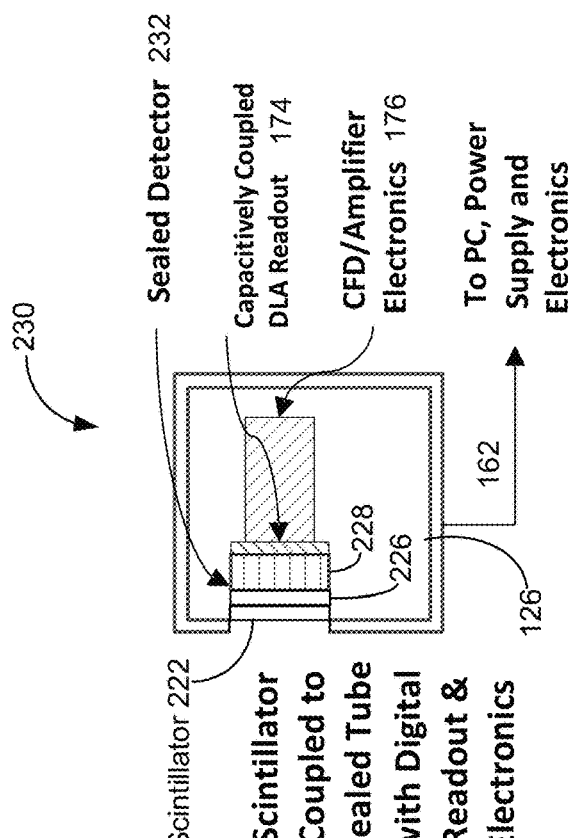

Referring to FIG. 10, in some implementations, a neutron imaging module 230 receives neutrons that pass through the sample object 108 and generates images or videos of the sample object 108. The neutron imaging module 230 includes a scintillator 222 and a sealed detector 232 positioned in a shielded housing 126. The shielded housing 126 includes neutron blocking or neutron absorbing material to block stray neutrons. The scintillator 222 is sensitive to neutrons and generates light upon detection of neutrons. Thus, the scintillator 222 generates an optical image of the sample object 108, and the light generated by the scintillator 222 is amplified by the sealed detector 232.

For example, the sealed detector 232 includes a photo-cathode 226 and a microchannel plate detector 228. The photo-cathode 226 converts the light from the scintillator 222 to electrons, and the microchannel plate detector 228 multiplies the electrons from the photo-cathode 226. The microchannel plate detector 228 can be either sensitive to neutrons or not sensitive to neutrons. The purpose of the microchannel plate detector 228 is to amplify the electron signals produced by the photo-cathode 226. The microchannel plate detector 228 includes an input electrode, an output electrode, a microchannel plate stack positioned between the input and output electrodes, and an anode (e.g., Germanium resistive film anode). Upon detection of a neutron, the microchannel plate stack outputs charge pulses that fall onto the anode, which is then capacitively coupled to an externally mounted delay line two-dimensional (2D) readout 174. The output of the delay line two-dimensional (2D) readout 174 is processed by a constant fraction discriminator (CFD) and amplifier electronics module 176.

The photo-cathode 226 can be replaced by another component that can convert the light from the scintillator 222 to electrons.

A signal/power bus 162 electrically couples the electronic components of the neutron imaging module 230 to a power supply, electronic circuitry, and a computer. For example, the electronic circuitry processes signals from the constant fraction discriminator and amplifier electronics module 176. For example, the computer includes one or more data processors for processing data from the neutron imaging module 230 to generate images and/or videos of the sample object 108.

The following describes details of the operations of the microchannel plate, e.g., 196 and 198 of FIG. 6. In some examples, the microchannel plate detector 196 and/or 198 includes boron-10 doped glass that forms the walls that define microchannels. When a boron-10 particle captures a neutron, an alpha particle ($^4$He) and a lithium-7 particle are released, as in the reaction below:

$$n+^{10}B\rightarrow\ ^{7}Li+^{4}He+Q,$$

where Q is the energy released in the reaction. One or both of the lithium-7 and helium-4 particles pass out of the glass and enter one or more adjacent channels, freeing electrons along the way. The bottom electrode 190 of the microchannel plate stack 180 has a more positive DC bias voltage than the top electrode 188 of the microchannel plate stack 180. The DC bias voltage generates an electric field (e.g., about 1 kV/mm) that attracts the free electrons toward the bottom electrode 190. As the electrons bounce against the channel walls, more electrons are released.

Figure 11:
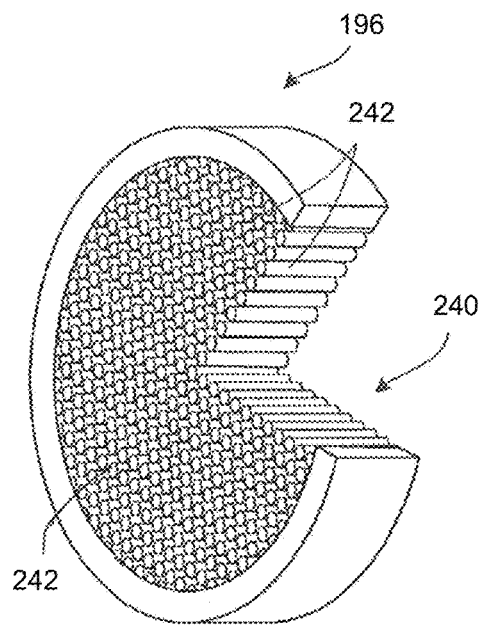
FIG. 11 is a diagram of an example microchannel plate.

Referring to FIG. 11, in some implementations, the microchannel plate 196 (or 198) of FIG. 6 includes a glass plate 240 that has an array of microscopic channels 242 each having a diameter of about, for example, 5 to 10 microns (μm). Each channel 242 can have, for example, a circular, square, rectangle, or hexagon cross sectional shape. Each channel 242 serves as an independent electron multiplier and has an inner wall surface formed of a semi-conductive and electron emissive layer. The glass plate 240 can have a thickness of, e.g., about 1 mm.

If a microchannel plate detector has a single microchannel plate, the input and output electrodes can be, for example, metal layers that are coated onto the input and output surfaces of the glass plate. The input and output electrodes have openings that correspond to the channel openings. If the microchannel plate detector has a stack of microchannel plates, the input electrode can be, e.g., a metal layer that is coated onto the input surface of the first microchannel plate, and the output electrode can be, e.g., a metal layer that is coated onto the output surface of the last microchannel plate.

In some implementations, the microchannel plate 196 includes boron-10 ($^{10}$B) doped glass that forms the walls that define the channels. When an incident neutron interacts with a boron-10 atom, an alpha particle (helium-4 or $^4$He) and a lithium-7 ($^7$Li) particle are released, as in the reactions below:

n+$^{10}$B→$^7$Li(0.83 MeV)+$^4$He (1.47 MeV)+gamma ray (478 keV) (occurs about 93% of the time), n+$^{10}$B→$^7$Li(1.0 MeV)+$^4$He (1.8 MeV) (occurs about 7% of the time).

One or both of the lithium-7 and helium-4 particles pass out of the glass and enter one or more adjacent channels, in most cases freeing several electrons along the way. In addition, other charged particles, for example protons, hydroxyl ions (OH$^-$), alkali ions (the glass plate 240 may include alkaline oxides) may also be freed by the lithium-7 and helium-4 particles, emerge from the glass walls and enter into the channels. For example, the glass plate 240 may include cesium oxides, and the alkali ions may include cesium ions.

In some implementations, the microchannel plate 196 includes lithium-6 ($^6$Li) doped glass that forms the walls that define the channels. When an incident neutron interacts with a lithium-6 atom, a triton and an alpha particle are released, as in the reactions below:

n+$^6$Li→triton (2.75 MeV)+alpha (2.05 MeV).

One or both of the triton and alpha particles pass out of the glass and enter one or more adjacent channels, in most cases freeing several (for example, 10 to 100) electrons along the way. In addition, other charged particles, such as protons, hydroxyl ions (OH$^-$), alkali ions (the glass plate 240 may include alkaline oxides) may also be freed by the triton and alpha particles, emerge from the glass walls and enter into the channels. For example, the glass plate 240 may include cesium oxides, and the alkali ions may include cesium ions.

In some implementations, the input electrode 188 may be connected to a voltage of about −2000 to −1000 volts, and the output electrode 190 may be connected to a voltage of about −100 volts. The voltages can be generated by a high-voltage power supply and a voltage divider having series connected resistors. The DC voltage difference between the input and output electrodes 188, 190 generates an electric field (e.g., about 1 kV/mm) that attracts the free electrons toward the output electrode 190. As the electrons strike against the channel walls, more electrons are released, triggering an avalanche of secondary electrons in the microchannels. The electrons pass through the openings in the output electrode 190 and are collected by the anode collector 192.

Figure 12:
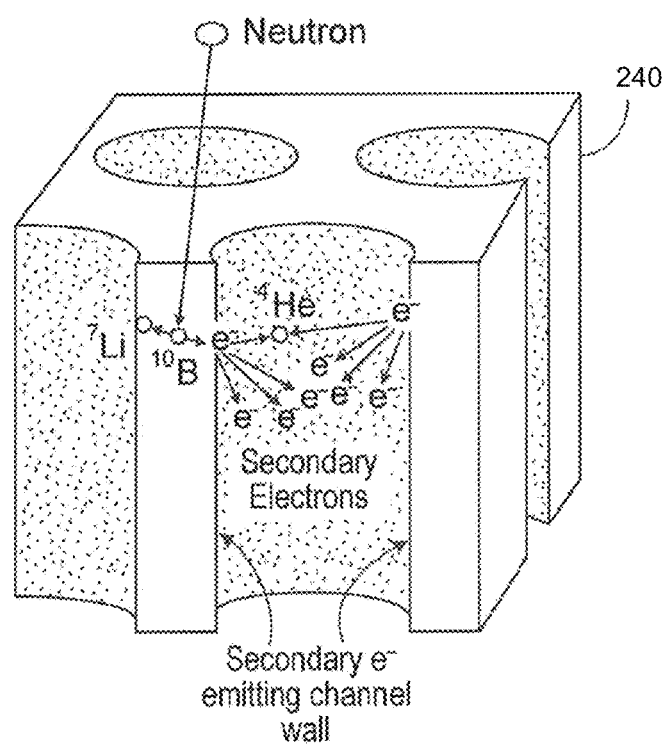
FIG. 12 is a diagram of example neutron capture and conversion in a microchannel plate.

FIG. 12 is a diagram of a bulk channel wall interaction between a neutron and a boron-10 atom, with the resulting alpha and lithium reaction particles producing secondary electrons in the hollow microchannels.

Figure 13:
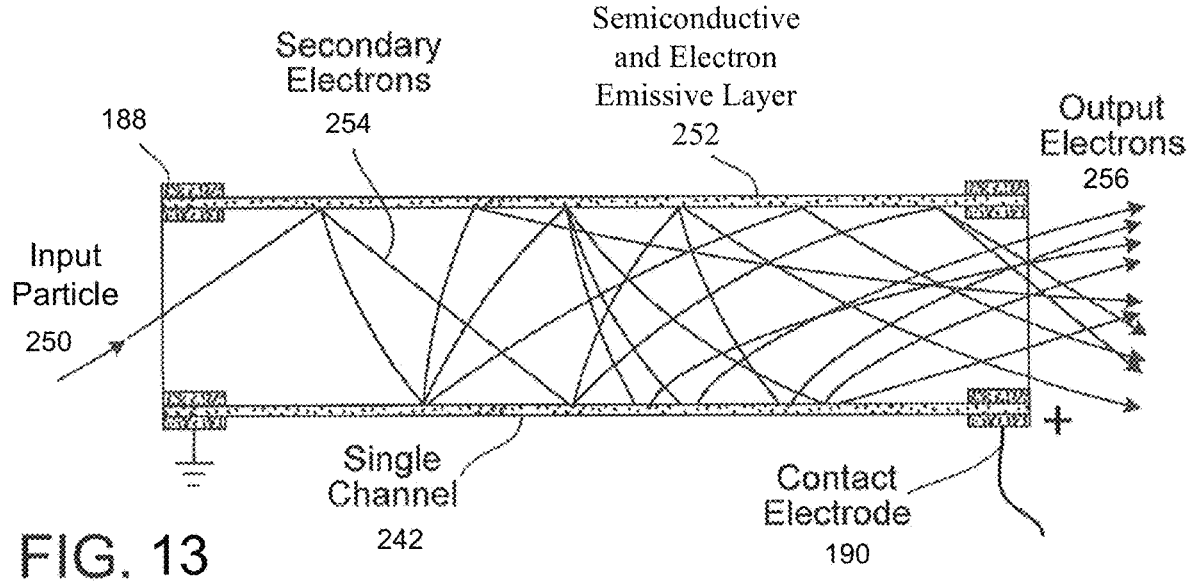
FIG. 13 is a diagram of an example microchannel and an example avalanche of secondary electrons.

FIG. 13 is a diagram showing a development of an avalanche of secondary electrons, as depicted here in response to an input particle striking the surface of the channel wall (e.g., photon or electron).

Referring to FIGS. 11, 12, and 13, the glass plate 240 has a substantially regular, parallel array of microscopic channels 242. A high DC voltage is applied between the input and output electrodes 188, 190. Each channel 242, which can serve as an independent electron multiplier, has an inner wall surface formed of a semiconductive and electron emissive layer 252. The bulk of the glass plate 240, which forms the structure supporting the microchannels 242, includes (e.g., is formed of) one or more neutron-sensitive compositions, such as compounds that include boron-10 (or lithium-6).

In the example where the glass includes boron-10, in operation, when an incident neutron 250 strikes the glass plate 240, the neutron 250 is captured by a boron-10 atom, and an alpha particle ($^4$He) and a lithium-7 ($^7$Li) particle are released, in opposite directions to conserve momentum. One or both of the lithium-7 and helium-4 particles pass out of the glass and enter one or more adjacent channels 242, freeing secondary electrons along the way. Concurrently, the DC bias voltage is applied between the input and output electrodes 188, 190 such that output electrode 190 has a more positive DC bias voltage than the input electrode 188. The DC bias voltage generates an electric field (e.g., about 1 kV/mm) that attracts free electrons toward the output electrode 190. As free electrons strike the channel walls, more electrons (for example, secondary electrons 254) are released to form a cascade of electrons 256 that exit the output surface of the glass plate 240 and is detected as a signal pulse at the anode 192 (FIG. 6).

In some implementations, a microchannel plate can be made of a hydrogen-containing material, such as a polymer or plastic. The plastic microchannel plates can be doped with a neutron-sensitive material, such as boron-10 or lithium-6. Alternatively, a layer of neutron sensitive material (e.g., boron-10 or lithium-6) can be disposed (e.g., by atomic layer deposition) on walls of the microchannels. Additional layers of material may be disposed on the walls of the microchannels, such as a layer of semiconducting material and a layer of electron emissive material. Examples of microchannel plates having layers of materials disposed on walls of the microchannels, the layers including a layer of neutron sensitive material, a layer of semiconducting material, and a layer of electron emissive material, are described in U.S. Pat. No. 8,507,872.

The plastic microchannel plate can be used for fast neutron detection (i.e., at MeV neutron energies), where the knock-on proton (also having an energy of ~MeV since it is an elastic collision) would enter the hollow microchannel and create an avalanche of secondary electrons.

The dimensions and shapes of the microchannels can be different from those described above. Boron-10 may exist in oxide form or in other form. The glass plate 240 of the microchannel plate 196, instead of being doped with boron-10, can be doped with lithium-6, which can capture neutrons as shown in the following reaction:

Li+$^1$n→$^3$H+$^4$He+Q(4.78 MeV);

In the case of lithium-6, the neutron capture reaction generates alpha particles (helium-4 ions) and triton particles (helium-3 ions) that can cause secondary electron emissions in the microchannels 242. The glass plate 240 can also be doped with a combination of boron-10 and lithium-6. Other neutron sensitive materials can also be used. For example, the microchannel plate can include hydrogen-containing material in which energetic protons are released and secondary electrons are produced within the microchannel plate when neutrons strike the hydrogen-containing material. The hydrogen-containing material can include, for example, a polymer that includes hydrogen atoms. The hydrogen-containing material can include, for example, a high-density polyethylene, nylon, or polyaramid. Such materials are described in, for example, U.S. Pat. No. 7,183,701.

Figure 14:
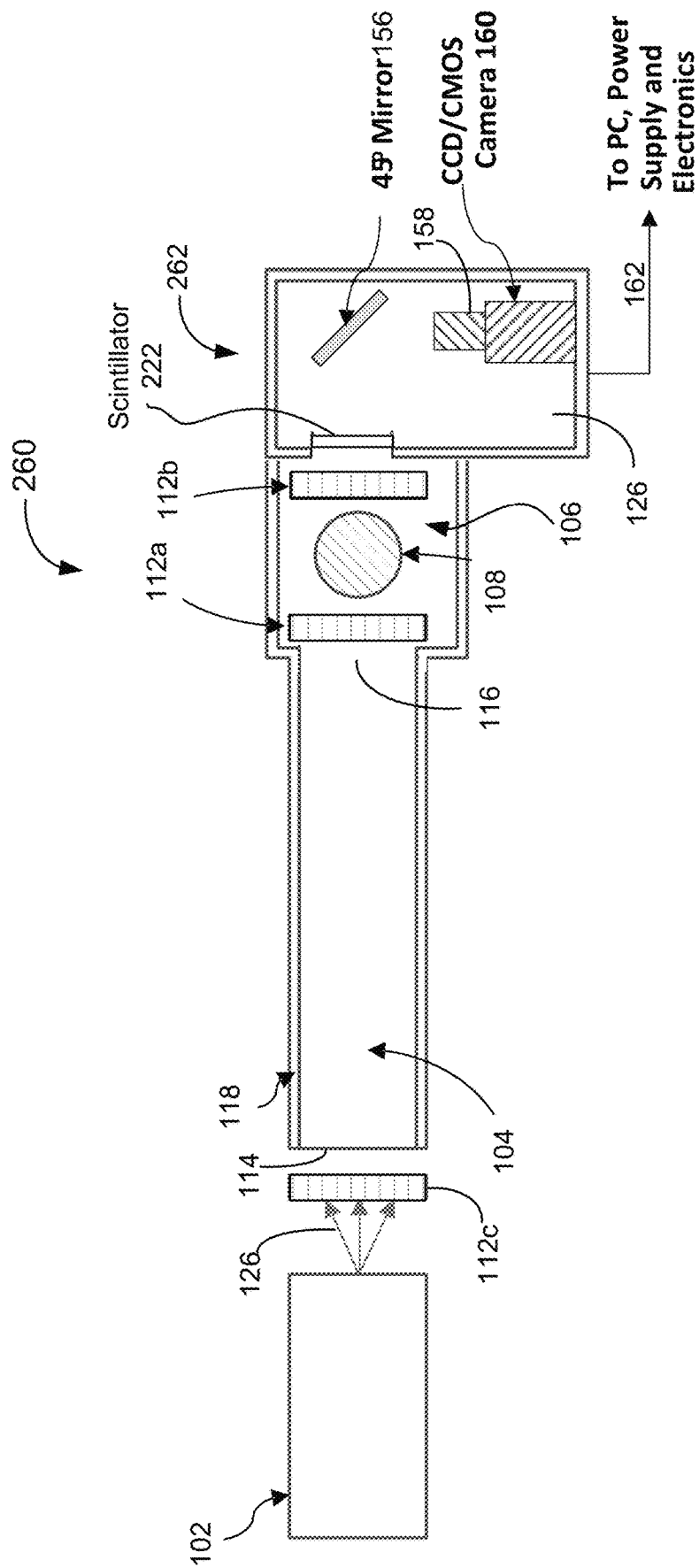
FIGS. 14 to 19 are block diagrams of example neutron imaging systems.

Referring to FIG. 14, in some implementations, a neutron imaging system 260 uses a neutron imaging module 262 having configuration similar to the example in FIG. 4, except that the sealed detector 152 is replaced with a scintillator 222 that is sensitive to neutrons. The scintillator 222 emits light upon detection of a neutron, and the light is captured by the camera 160. By using a neutron shield to block stray neutrons from reaching the scintillator 222, the neutron images generated by the neutron imaging system 260 has a higher resolution and/or contrast compared to a system that does not use a neutron shield to block the stray neutrons.

Figure 15:
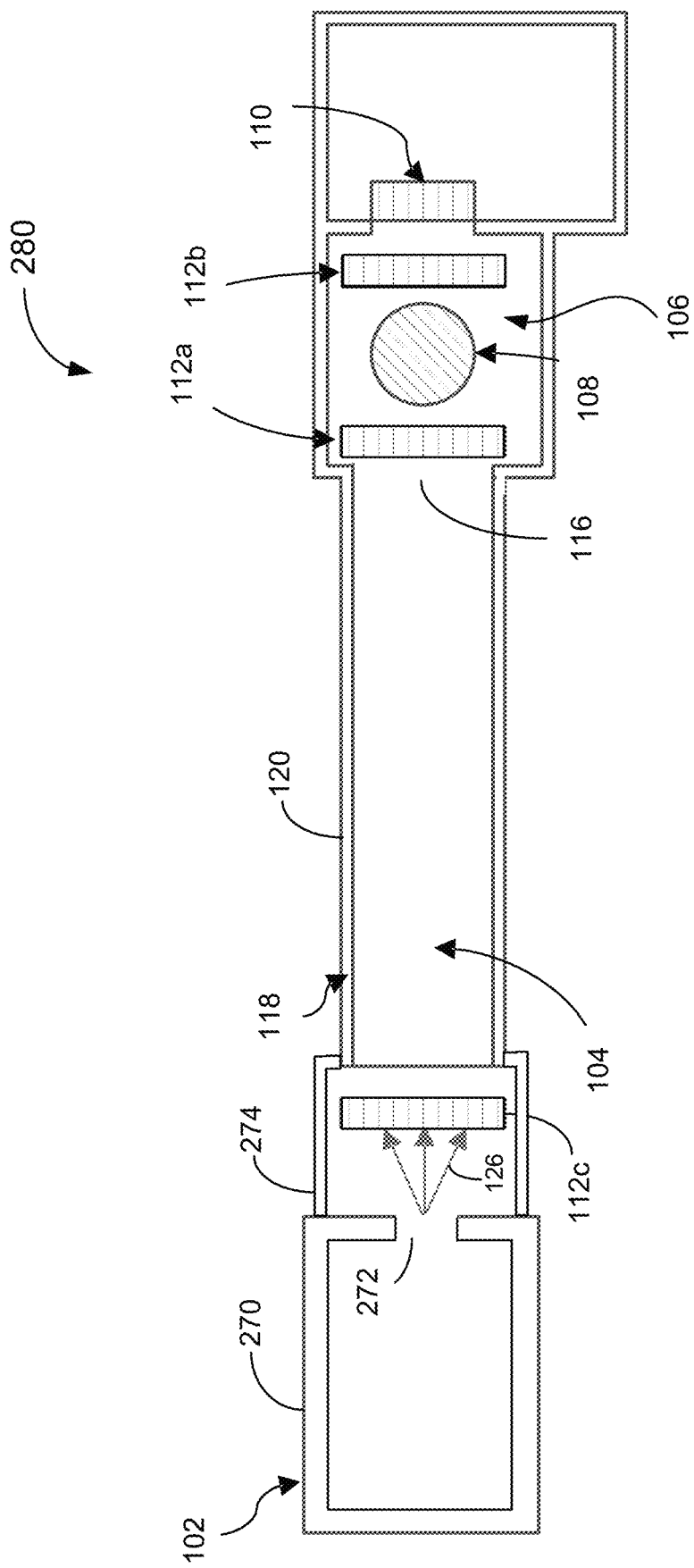

Referring to FIG. 15, in some implementations, a neutron imaging system 280 includes a neutron generator 102 that has a neutron shield 270 that surrounds the neutron generator 102 except for an opening 272 that allows neutrons 126 to be emitted from the neutron generator 102. The neutrons 126 emitted from the opening 272 travel in various directions. A neutron shield 274 is provided between the flight tube shield 120 and the neutron generator 102 to absorb or block neutrons that do not enter the flight tube 104 through the input opening 114. In some implementations, the flight tube shield 120 can extend to the neutron generator 102 to absorb or block neutrons that do not enter the flight tube 104 through the input opening 114.

The neutron shield can have many shapes and configurations. In some implementations, the neutron blocking material is applied to the inner and/or outer walls of the flight tube 104, the chamber 106, and the housing 126 for the microchannel plate detector or the scintillator. In some implementations, the neutron shield can include two or more layers of neutron blocking or absorbing material.

Figure 16:
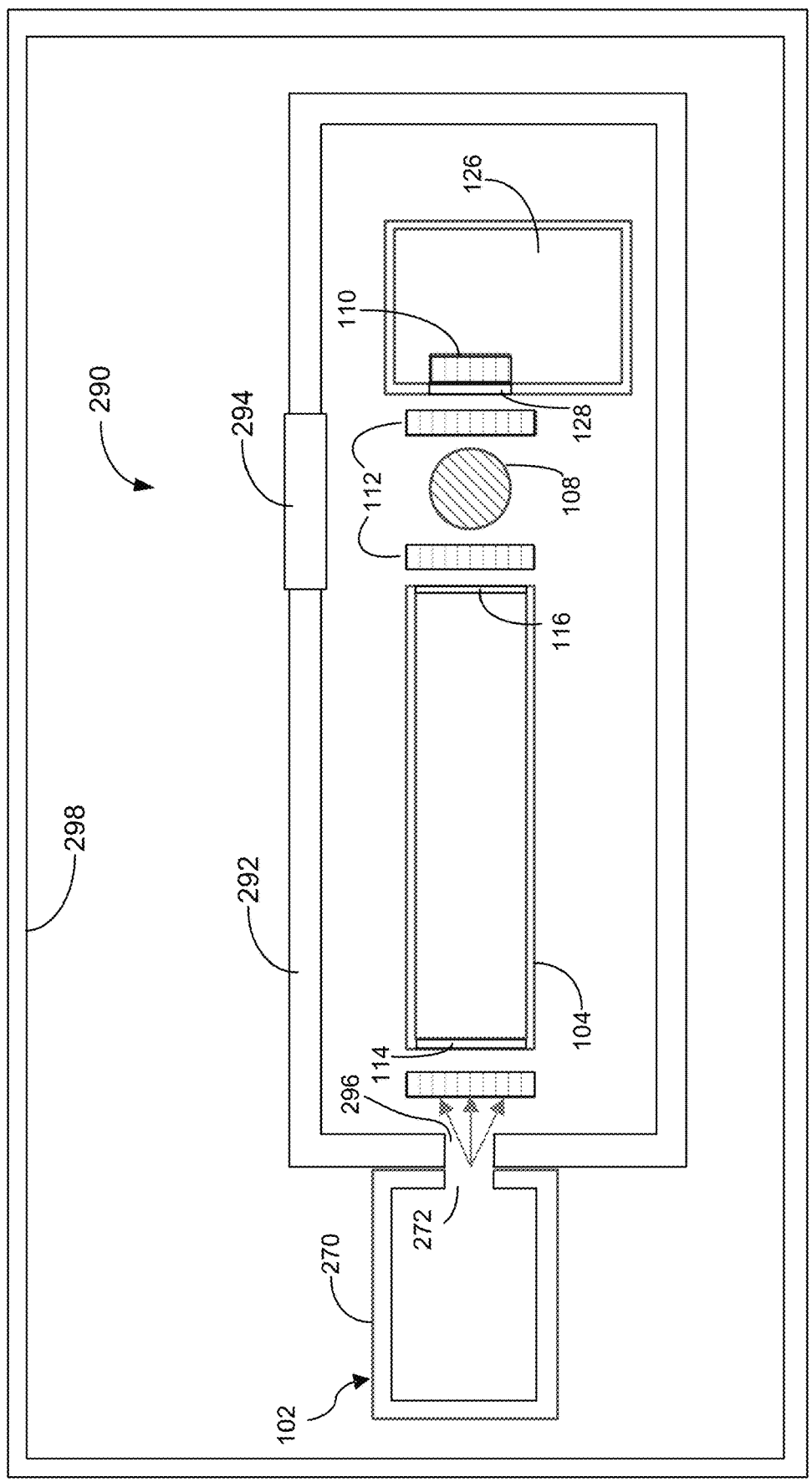

Referring to FIG. 16, in some implementations, a neutron imaging system 290 includes a neutron shield 292 that surrounds the flight tube 104, the sample object 108, and the housing 126 for the neutron imaging module. The neutron shield 292 includes neutron blocking or neutron absorbing material. The neutron shield 292 has a door 294 that can be opened to allow the sample object 108 to be placed inside the neutron shield 292 or moved out of the neutron shield 292. The neutron shield 292 has an opening 296 that is aligned with an opening of the neutron shield 270 of the neutron generator 102. The opening 296 allows neutrons from the neutron generator 102 to enter the flight tube 104. The neutron shield 292 absorbs or blocks stray neutrons that do not enter the flight tube 104 through the input opening 114. The neutron shield 292 can have any one of various shapes, such as a cylinder or a tube having a rectangular cross section.

It is possible that some neutrons generated by the neutron generator 102 may initially pass through the neutron shield and be reflected by walls 298 or other objects in the room where the neutron imaging system 290 is located. The neutron shield 292 will block the stray neutrons that are reflected by the walls 298 or other objects in the room from reaching the neutron imaging module (e.g., including the microchannel plate or the scintillator).

Figure 17:
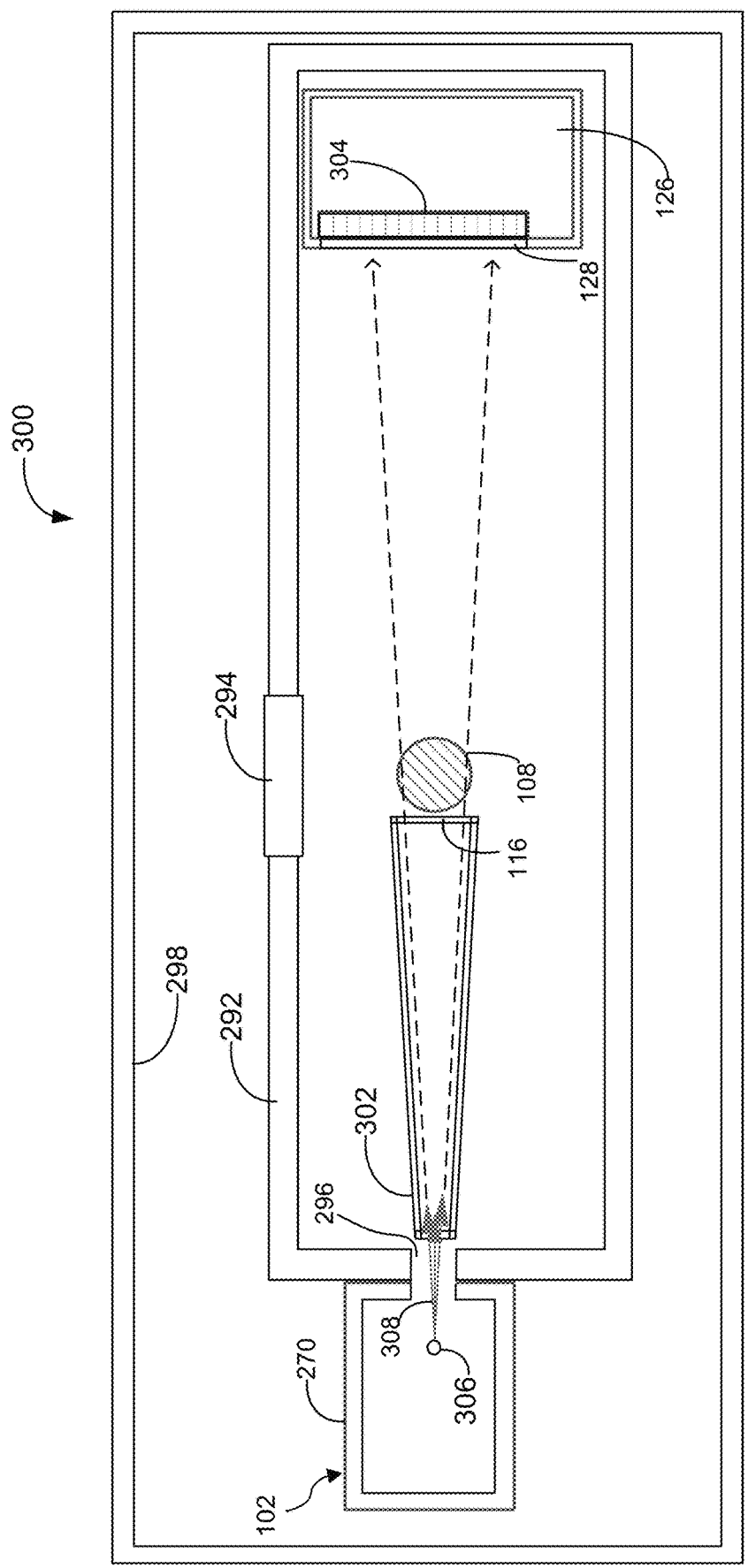

Elements of different embodiments described above may be combined to form embodiments not specifically described herein. Other implementations not specifically described herein are also within the scope of the following claims. For example, referring to FIG. 17, a neutron imaging system 300 includes an evacuated flight tube 302 having a conical shape that allows a beam of diverging neutrons to pass through. A large microchannel plate detector 304 or an array of microchannel plate detectors 304 is placed at a large distance from the sample object 108. The system 300 does not use any microchannel plate collimator. In this example, the neutron generator 102 includes a metal hydride target 306 that is much smaller than the sample object 108, in which the target 306 can be considered a point source of neutrons. The flight tube 302 enables the selection of a beam of divergent neutrons 308 that pass the sample object 108 and continue to diverge until the neutrons are detected by the microchannel plate detector(s) 304, which produces a magnified image of the sample object 108. Assuming that the distance between the target 306 and the sample object 108 is s1, and the distance between the target 306 and the microchannel plate detector(s) 304 is s2, the microchannel plate detector(s) 304 generates an image of the sample object 108 magnified at s2/s1 times.

Figure 18:
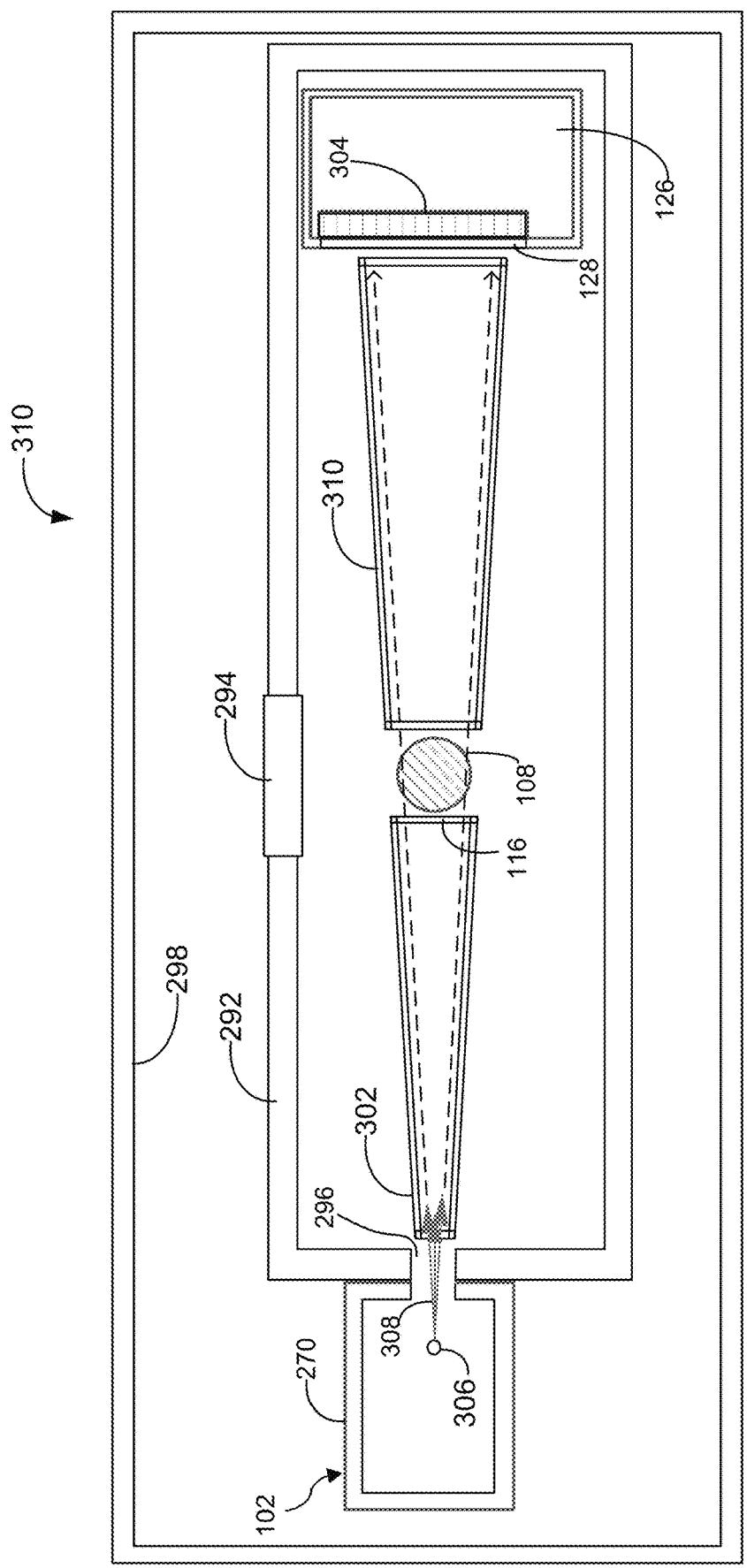

Referring to FIG. 18, in some implementations, the neutron imaging system 300 can be modified by adding another flight tube between the sample object 108 and the microchannel plate detector(s) 304. A neutron imaging system 310 includes a first evacuated flight tube 302 and a second evacuated flight tube 310. Each of the evacuated flight tubes 302 and 310 has a conical shape. The input opening of the second flight tube 310 is slightly larger than the output opening of the first flight tube 302. The first evacuated flight tube 302 is positioned between the neutron generator 102 and the sample object 108, and the second evacuated flight tube 310 is positioned between the sample object 108 and the microchannel plate detector(s) 304. The second evacuated flight tube 310 reduces the neutron scatter from the air between the sample object 108 and the microchannel plate detector(s) 304. Similar to the neutron imaging system 300, the neutron imaging system 310 generates an image of the sample object 108 magnified at s2/s1 times at the microchannel plate detector(s) 304.

Figure 19:
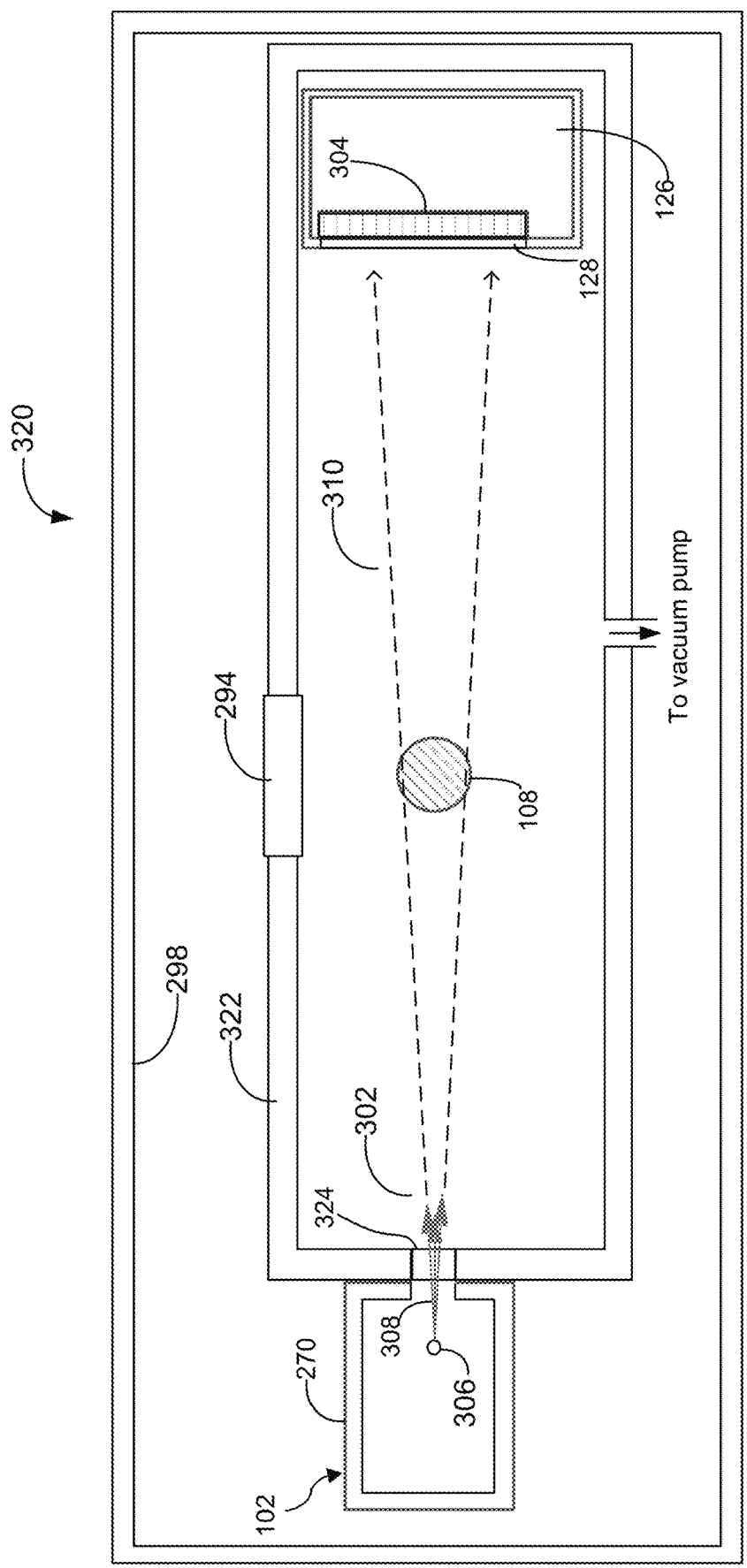

Referring to FIG. 19, in some implementations, a neutron imaging system 320 includes an evacuated neutron shield 322 having a neutron-transparent input window 324. The neutron shield 322 forms a vacuum chamber that is actively pumped to reduce the number of air molecules in the chamber. The sample object 108 is positioned at a distance d1 from the target 306 of the neutron generator 102. The neutrons that are generated by the target 306 and reach the sample object 108 are similar to a beam of divergent neutrons. Assume that the distance between the target 306 and the microchannel plate detector(s) 304 is d2, the beam of divergent neutrons 308 produces an image of the sample object 108 magnified at d2/d1 times at the microchannel plate detector(s) 304.

The example of FIG. 1 includes a flight tube 104 and a flight tube shield 120. The flight tube 104 can be rigid, and the flight tube shield 120 can be made of flexible radiation shield material. Multiple types of shielding can be mounted on the flight tube 104, such as shielding material that includes lithium placed on the inner side of the flight tube shield 120, and shielding material that includes boron placed on the outer side of the flight tube shield 120.

In some example, the flight tube shield 120 can be made of rigid material in the shape of a flight tube. In this case, the flight tube 104 can be eliminated and the flight tube shield 120 also provides the same functions as the flight tube 104.

The thickness of the flight tube shield 120, the chamber shield 122, and the detector shield 124 depend partly on the neutron energy spectra at the various locations. The thickness of the flight tube shield 120, the chamber shield 122, and the detector shield 124 can be the same or different. The thickness of different parts of the flight tube shield 120 can be the same or different. For example, the flight tube shield 120 can have a thickness that varies from one end of the flight tube to the other. Similarly, the thickness of different parts of the chamber shield 122 can be the same or different; the thickness of different parts of the detector shield 124 can be the same or different.

As discussed above, the neutron shield can include borated-polyethylene, lithiated-polyethylene, boron carbide ($B_4C$), borated carbide aluminum (Boral®, $B_4CAl$), Boraflex (silicone polymer and boron carbide powder), borated silicone sheet (Flexi-Boron), gadolinium, cadmium, boron-loaded bricks, and/or lithium-loaded bricks. The concentration of each of the components mentioned above (e.g., borated-polyethylene, lithiated-polyethylene, boron carbide, borated carbide aluminum, silicone polymer, boron carbide powder, borated silicone, gadolinium, cadmium can be designed to optimize for the neutron energy spectra, and different parts of the shield can have different concentrations of the components. In some examples, the neutron shield includes multiple layers of components. Many combinations of the components with different concentrations can be used.

In some implementations, the neutron shield has a modular design in which various combinations of shielding modules can be coupled together. For example, different shielding modules can include different neutron absorbing materials, or different concentrations of neutron absorbing materials, or different thicknesses of shielding panels. Depending on the application, fewer or more layers of neutron shield panels (rigid or flexible) can be used. For example, a robot having one or more neutron sensors can measure the neutron energy spectra at various locations around the flight tube, chamber, and detector in which the neutrons travel along paths that may affect the imaging results, and add neutron shielding modules at selected locations of the neutron imaging system to minimize the effects of stray neutrons on the images captured by the detector.

What is claimed is:

1. A neutron imaging system comprising:
  a neutron generator that is configured to produce neutrons from a nuclear fusion reaction;
  a shielded flight tube that has an input opening, an output opening, a flight tube wall extending from the input opening to the output opening, and a flight tube shield surrounding the flight tube wall, in which the flight tube is positioned relative to the neutron generator to enable neutrons from the neutron generator to enter the flight tube through the input opening and exit the flight tube through the output opening, and the flight tube shield is configured to substantially block neutrons outside of the flight tube from entering the flight tube through the flight tube wall;
  a sample chamber configured to support a sample object at a position to receive neutrons that pass through the output opening of the flight tube; and
  a shielded neutron detector comprising a microchannel plate detector and a detector shield, in which the microchannel plate detector includes an input electrode, an output electrode, and a microchannel plate defining microscopic channels, the input electrode is configured to be connected to a first voltage, the output electrode is configured to be connected to a second voltage different from the first voltage, the neutron detector is configured receive at least a portion of the neutrons that pass through the sample object and generate output signals upon detection of the neutrons, and the detector shield is configured to substantially block neutrons other than those that have traveled the entire length of flight tube and pass through the output opening of the flight tube from reaching the neutron detector.

2. The neutron imaging system of claim 1 in which the neutron generator comprises a compact linear accelerator, and the neutron generator is configured to produce neutrons by fusing isotopes of hydrogen.

3. The neutron imaging system of claim 1 in which the neutron generator does not include a nuclear fission reactor neutron source, does not include a radioisotope fission neutron source, and does not include a radionuclide fission neutron source.

4. The neutron imaging system of claim 1, comprising a microchannel plate neutron collimator that comprises a microchannel plate defining a plurality of microscopic channels, in which each of the microscopic channels has a length to diameter (L/D) ratio of at least 10, and the microchannel plate neutron collimator is positioned in the path of at least some of the neutrons provided by the neutron generator.

5. The neutron imaging system of claim 4 in which the microchannel plate neutron collimator comprises a plurality of microchannels, each microchannel comprises a cladding glass and a hollow core, and the cladding glass comprises at least one of boron-10, lithium-6, or gadolinium.

6. The neutron imaging system of claim 4 in which the microchannel plate neutron collimator comprises a plurality of microchannels, each microchannel comprises a cladding glass and a solid core, the cladding glass comprises at least one of boron-10, lithium-6, or gadolinium, and the solid core does not include a neutron sensitive material.

7. The neutron imaging system of claim 4 in which the microchannel plate neutron collimator is positioned in front of the flight tube in the path of the neutron beam.

8. The neutron imaging system of claim 4 in which the microchannel plate neutron collimator is positioned after the flight tube and before the sample in the path of the neutron beam.

9. The neutron imaging system of claim 4 in which the microchannel plate neutron collimator is positioned after the sample in the path of the neutron beam.

10. The neutron imaging system of claim 1 in which at least one of the flight tube shield or the detector shield comprises at least one of borated-polyethylene, lithiated-polyethylene, boron carbide ($B_4C$), borated carbide aluminum (Boral®, $B_4CAl$), Boraflex (silicone polymer and boron carbide powder), borated silicone sheet (Flexi-Boron), gadolinium, cadmium, boron-loaded bricks, or lithium-loaded bricks.

11. The neutron imaging system of claim 1 in which the detector shield comprises gadolinium, and a layer of high atomic number, high density material is provided between the gadolinium and the neutron detector to reduce the amount of gamma rays and other products resulting from reactions between neutrons and the gadolinium that reach the neutron detector.

12. The neutron imaging system of claim 11 in which the high density material comprises at least one of lead (Pb), iron (Fe), tungsten (W), bismuth (Bi), or tantalum (Ta).

13. The neutron imaging system of claim 1 in which the neutron detector is configured to generate a signal upon detection of the neutrons, and the neutron imaging system further comprises an imaging device that is configured to detect the signal generated by the neutron detector.

14. The neutron imaging system of claim 13 in which the neutron detector is configured to generate a photon radiation upon detection of the neutron,
  wherein the shielded flight tube and the shielded neutron detector are aligned along a longitudinal axis of the neutron imaging system, the neutron imaging system further comprises at least one mirror to redirect the photon radiation from the neutron detector toward the imaging device such that the redirected radiation travels along a path that is at an angle relative to the longitudinal axis of the neutron imaging system, the angle being at least 10 degrees, and the imaging device is positioned at a location outside of the path of the neutrons that pass through the flight tube.

15. The neutron imaging system of claim 13 in which the imaging device comprises a shielded imaging sensor that includes an imaging sensor shield that is configured to substantially block neutrons other than the neutrons that pass through the entire length of the flight tube and pass through the output of the flight tube.

16. The neutron imaging system of claim 15 in which the imaging sensor shield and the detector shield form a continuous neutron shield that defines a space that accommodates both the microchannel plate detector and the imaging sensor.

17. The neutron imaging system of claim 13 in which a distance L between the neutron generator and the imaging device and a diameter of the input opening of the flight tube have a ratio L/D of at least 5.

18. The neutron imaging system of claim 13 in which a distance L between the neutron generator and the imaging sensor and a diameter of the input opening of the flight tube have a ratio L/D of at least 1000.

19. The neutron imaging system of claim 1 in which the neutron generator is configured to provide a non-collimated neutron beam that spreads out or diverges at least 5 degrees relative to a longitudinal axis of the flight tube.

20. The neutron imaging system of claim 1 in which images generated by the neutron imaging system are at least one of sharper or having higher contrast than images generated by the neutron imaging system with the flight tube shield removed.

21. The neutron imaging system of claim 1 in which the shielded neutron detector comprises an actively pumped vacuum enclosure that encloses the microchannel plate detector.

22. The neutron imaging system of claim 1 in which the shielded neutron detector comprises a sealed and evacuated enclosure that encloses the microchannel plate detector, and the flight tube has a length to diameter ratio of at least 5.

23. The neutron imaging system of claim 1 in which the flight tube has a length to diameter ratio of at least 1000.

24. The neutron imaging system of claim 1 in which the microchannel plate detector comprises a neutron-sensitive microchannel plate that comprises a hydrogen-containing material.

25. The neutron imaging system of claim 24 in which the hydrogen-containing material comprises at least one of polymer or plastic.

26. The neutron imaging system of claim 1 in which the microchannel plate detector comprises a neutron-sensitive microchannel plate that comprises (i) at least one of boron-10, lithium-6 or gadolinium, and (ii) a hydrogen-containing material.

27. The neutron imaging system of claim 1 in which the sample chamber comprises a shielded sample chamber having a shielded wall that defines an input opening and an output opening, the input opening of the sample chamber is configured to receive neutrons that pass through the output opening of the flight tube, the output opening of the sample chamber is configured to allow the neutrons that pass through the sample to exit the sample chamber through the output opening of the sample chamber, and the shielded wall is configured to substantially block neutrons other than the neutrons that pass through the output opening of the flight tube from entering the sample chamber.

28. The neutron imaging system of claim 1 in which the flight tube shield and the detector shield form a continuous neutron shield that defines a space that accommodates both the flight tube and the microchannel plate detector.

29. The neutron imaging system of claim 1 in which the shielded flight tube comprises an evacuated shielded flight tube that is configured to have a pressure less than a standard atmospheric pressure.

30. The neutron imaging system of claim 1 in which the shielded flight tube is filled with an inert gas.

31. The neutron imaging system of claim 30 in which the flight tube is sealed at the input opening and the output opening with a neutron-transparent window.

32. The neutron imaging system of claim 30 in which the inert gas comprises at least one of helium or argon.

33. The neutron imaging system of claim 1 in which the flight tube shield comprises a thermal neutron shielding material that includes at least one of boron, lithium, gadolinium, or cadmium.

34. The neutron imaging system of claim 1 in which the input opening and output opening of the flight tube are open to the environment, and the flight tube is in fluid communication with the atmosphere.

35. The neutron imaging system of claim 1 in which the flight tube shield comprises a first concrete layer including components configured to slow down at least some of the neutrons, a second concrete layer including components configured to absorb at least some of the neutrons, and a layer of lead or iron configured to stop radiation produced by reactions in the first and second concrete layers.

36. The neutron imaging system of claim 1 in which the microchannel plate detector comprises a neutron-sensitive microchannel plate that comprises at least one of boron-10, lithium-6, or gadolinium.

37. A neutron imaging system comprising:
a neutron generator that is configured to produce neutrons from a nuclear fusion reaction;
an elongated flight tube that has an input opening, an output opening, and a flight tube wall extending from the input opening to the output opening, in which the flight tube is positioned relative to the neutron generator to enable neutrons from the neutron generator to enter the flight tube through the input opening and exit the flight tube through the output opening, and the flight tube has a length to diameter (L/D) ratio of at least 5;
a sample chamber configured to support a sample at a position to receive neutrons that pass through the output opening of the flight tube;
a neutron detector comprising a microchannel plate detector having an input electrode, an output electrode, and a glass plate comprising microscopic channels, in which the input electrode is configured to be connected to a first voltage, the output electrode is configured to be connected to a second voltage different from the first voltage, and the neutron detector is configured receive at least a portion of the neutrons that pass through the sample and generate output signals upon detection of the neutrons;
circuitry configured to process the output signals of the neutron detector to generate an image or a video of the sample; and
a neutron shield that substantially surrounds the flight tube and the neutron detector, in which the neutron shield has an opening around the input opening of the flight tube to allow neutrons to enter the flight tube through the input opening, the neutron shield comprises a material that is configured to substantially block neutrons outside of the flight tube from entering the flight tube through the flight tube wall, the neutron shield is configured to allow neutrons exiting the output opening of the flight tube to reach the neutron detector and substantially block neutrons other than those that have traveled inside the entire length of flight tube and exit the output opening of the flight tube from reaching the neutron detector.

38. The neutron imaging system of claim 37, comprising a microchannel plate neutron collimator comprising a plurality of microscopic channels, in which each of the microscopic channels has a length to diameter (L/D) ratio of at least 10, and the microchannel plate neutron collimator is positioned in the path of the neutron beam.

39. A neutron imaging system comprising:
a neutron generator that is configured to produce neutrons from a nuclear fusion reaction;
a flight tube that has an input opening, an output opening, and a flight tube wall extending from the input opening to the output opening, in which the flight tube is positioned relative to the neutron generator to enable neutrons from the neutron generator to enter the flight tube through the input opening and exit the flight tube through the output opening;
a stage configured to support a sample object at a position to receive neutrons that pass through the entire length of the flight tube and exit through the output opening of the flight tube;
a neutron imaging module having a neutron-sensitive component that is sensitive to neutrons and configured to receive neutrons that pass through the sample object and generate neutron detection signals that can be used to generate an image or video of the sample object; and
a neutron shield that surrounds at least a portion of the flight tube and at least a portion of the neutron imaging module to block at least a portion of stray neutrons that travel toward the neutron-sensitive component of the neutron imaging module, in which the stray neutrons do not enter the flight tube through the input opening of the flight tube.

40. The neutron imaging system of claim 39 in which the neutron shield comprises at least one of borated-polyethylene, lithiated-polyethylene, boron carbide ($B_4C$), borated carbide aluminum (Boral®, $B_4CAl$), Boraflex (silicone polymer and boron carbide powder), borated silicone sheet (Flexi-Boron), gadolinium, cadmium, boron-loaded bricks, or lithium-loaded bricks.

41. The neutron imaging system of claim 39 in which the neutron shield surrounds the flight tube, the stage, and the neutron imaging module, and has an input opening that aligns with an output opening of the neutron generator, and the input opening of the neutron shield allows neutrons emitted from the output opening of the neutron generator to reach the flight tube.

42. The neutron imaging system of claim 39 in which the neutron-sensitive component includes a microchannel plate that includes a material that is sensitive to neutrons.

43. The neutron imaging system of claim 42 in which the microchannel plate is disposed in an evacuated hermetically sealed image tube.

44. The neutron imaging system of claim 42 in which the microchannel plate is disposed in an actively pumped vacuum enclosure.

45. A neutron imaging system comprising:
a neutron generator that is configured to produce neutrons from a nuclear fusion reaction;
a shielded flight tube that has an input opening, an output opening, a flight tube wall extending from the input opening to the output opening, in which the flight tube is positioned relative to the neutron generator to enable neutrons from the neutron generator to enter the flight tube through the input opening and exit the flight tube through the output opening, and the flight tube wall includes one or more components that are configured to substantially block neutrons outside of the flight tube from entering the flight tube through the flight tube wall;
a sample chamber configured to support a sample object at a position to receive neutrons that pass through the output opening of the flight tube; and
a shielded neutron detector comprising a microchannel plate detector and a detector shield, in which the microchannel plate neutron detector is configured receive at least a portion of the neutrons that pass through the sample object and generate output signals upon detection of the neutrons, and the detector shield is configured to substantially block neutrons other than those that have traveled the entire length of flight tube and pass through the output opening of the flight tube from reaching the neutron detector.

* * * * *